United States Patent [19]

Higashihara et al.

[11] Patent Number: 5,140,359
[45] Date of Patent: Aug. 18, 1992

[54] MULTI-POINT DISTANCE MEASURING APPARATUS

[75] Inventors: Masaki Higashihara, Yokohama; Ichiro Ohnuki, Kawasaki; Akira Akashi, Yokohama; Terutake Kadohara, Yokohama; Hidehiko Fukahori, Yokohama; Yasuo Suda, Yokohama; Kenji Itoh, Yokohama, all of Japan

[73] Assignee: Canon Kabushiki Kaisha, Tokyo, Japan

[21] Appl. No.: 684,499

[22] Filed: Apr. 15, 1991

Related U.S. Application Data

[63] Continuation of Ser. No. 471,028, Jan. 26, 1990, abandoned, which is a continuation of Ser. No. 352,193, May 15, 1989, abandoned.

[30] Foreign Application Priority Data

May 16, 1988 [JP] Japan ............... 63-118821

[51] Int. Cl.$^5$ ............................. G03B 13/36
[52] U.S. Cl. .................................. 354/402
[58] Field of Search ............ 354/402, 406, 407, 408, 354/403, 400, 409; 250/201.2, 201.8

[56] References Cited

U.S. PATENT DOCUMENTS

| | | | |
|---|---|---|---|
| 4,047,187 | 9/1977 | Mashimo et al. | 354/402 |
| 4,614,975 | 9/1986 | Kaite | 354/402 X |
| 4,681,419 | 7/1987 | Sakai et al. | 354/402 |
| 4,709,138 | 11/1987 | Suda et al. | 354/408 X |
| 4,762,986 | 8/1988 | Suda et al. | 354/402 X |
| 4,768,052 | 8/1988 | Hamada et al. | 354/402 |
| 4,783,677 | 11/1988 | Hamada et al. | 354/402 |
| 4,800,261 | 1/1989 | Akashi | 354/408 X |
| 4,816,856 | 3/1989 | Hamada et al. | 354/402 |
| 4,831,403 | 5/1989 | Ishida et al. | 354/402 |
| 4,855,776 | 8/1989 | Akashi | 354/402 |
| 4,860,045 | 8/1989 | Hamada et al. | 354/402 |
| 4,908,645 | 3/1990 | Higashihara et al. | 354/402 |
| 4,959,678 | 9/1990 | Nakagawa | 354/403 |

FOREIGN PATENT DOCUMENTS 62-125311 6/1987 Japan .
62-139511 6/1987 Japan .
62-139512 6/1987 Japan .

Primary Examiner—W. B. Perkey
Attorney, Agent, or Firm—Fitzpatrick, Cella, Harper & Scinto

[57] ABSTRACT

An auto focusing device for foreseeing-calculating lens driving data for making a lens focus on an object after a predetermined time on the basis of the past focus adjusting operation data and the latest focus detection data. A plurality of distance measuring points are read to effect distance measurements at a time. Data suitable for foreseeing calculation is found from the respective distance measuring points, and the data suitable for foreseeing calculation is specified as the latest focus detection data used for the foreseeing calculation.

59 Claims, 19 Drawing Sheets

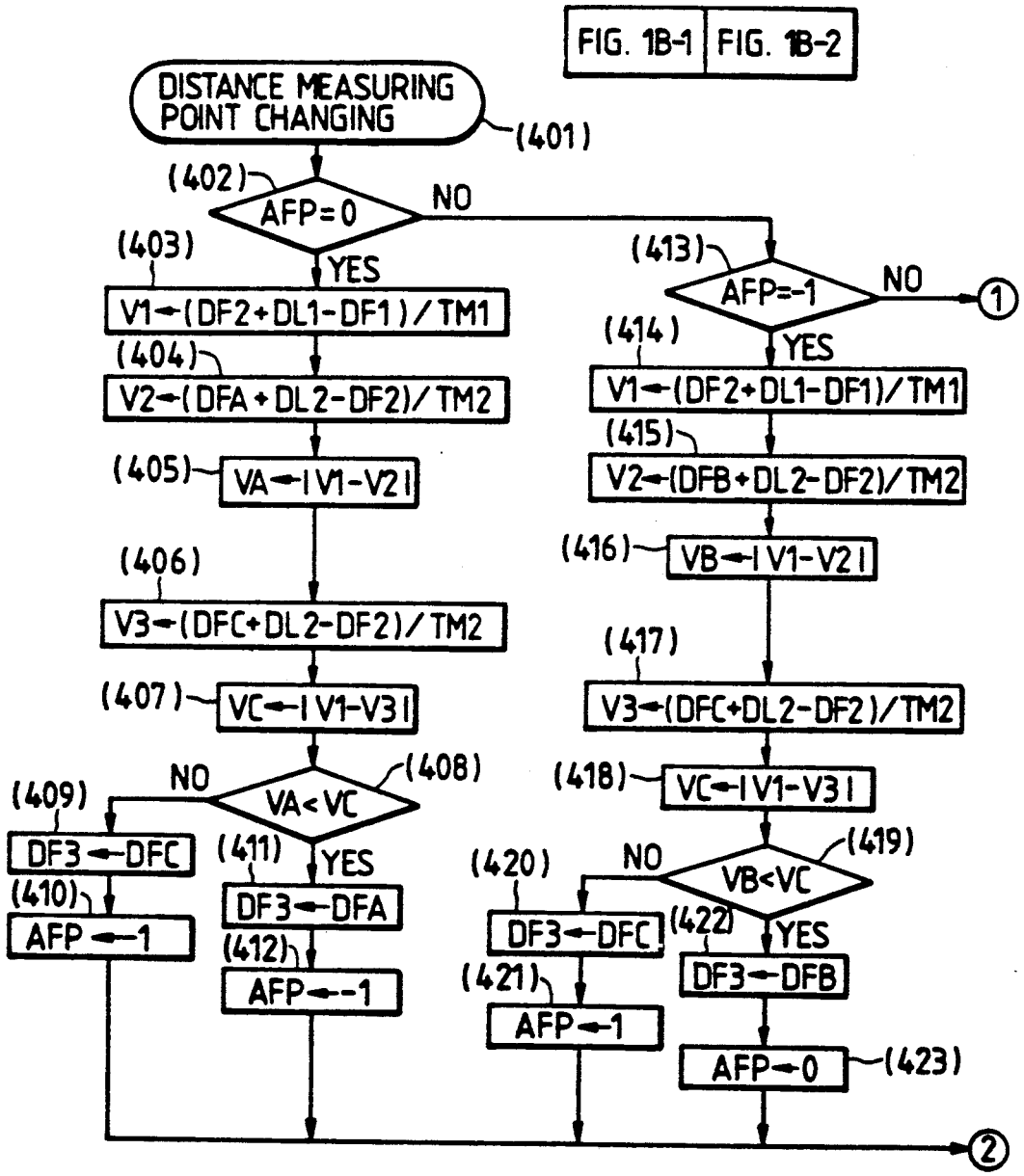

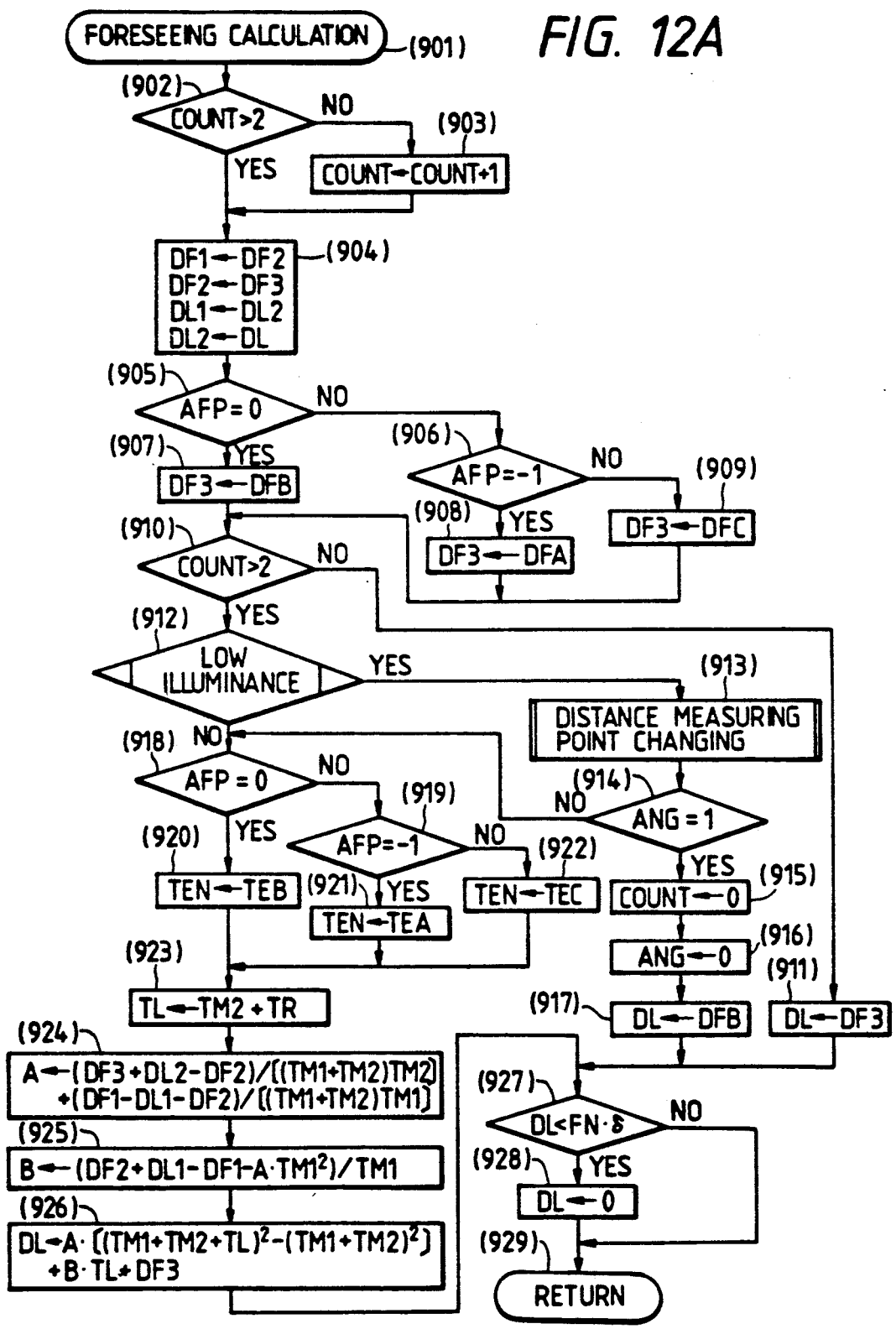

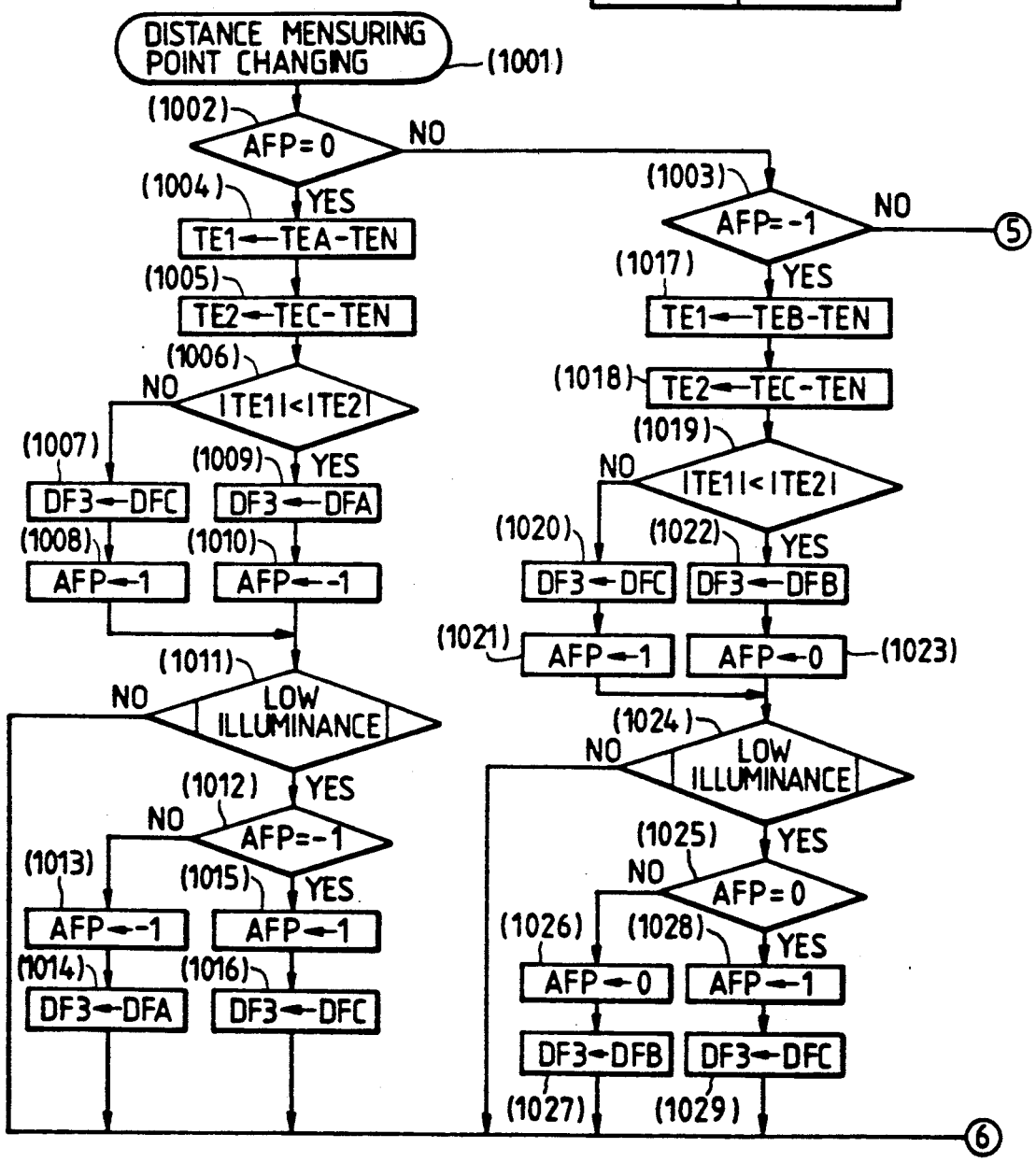

MULTI-POINT DISTANCE MEASURING APPARATUS

This application is a continuation of application Ser. No. 07/471,028 filed Jan. 26, 1990, which is a continuation of Ser. No. 07/352,193, filed May 15, 1989, both now abandoned.

BACKGROUND OF THE INVENTION

1, Field of the Invention

This invention relates to an automatic focus adjusting device having a plurality of distance measuring points and is used in a camera or the like.

2, Related Background Art

Many of the automatic focus adjusting systems for single-lens reflex cameras are such that the lens is focused on an object by repetitively effecting the cycles of "focus detection (sensor signal input and focus detection calculation) and lens driving". The amount of lens driving in each cycle is based on the defocus amount at a point of time whereat focus detection has been effected in that cycle, and this presumes that the defocus amount during focus detection will be eliminated at the end of lens driving.

As a matter of course, focus detection and lens driving require a certain amount of time, but in the case of a stationary object, the defocus amount does not vary as long as the lens is not driven. Therefore, the defocus amount to be eliminated at a point of time whereat lens driving has been completed is equal to the defocus amount at a point of time whereat focus detection has been effected and thus, correct focus adjustment is accomplished.

However, in the case of an object which is in motion, the defocus amount may vary during focus detection and lens driving, and therefore the be eliminated and the detected defocus amount may differ remarkly from each other. This results in the problem that the lens is not in focus on the object at the end of lens driving.

Automatic focus adjusting methods directed to a solution to the above-noted problem are proposed in Japanese Laid-Open Patent Applications Nos. 62-125311, 62-139512 and 62-139511 and previously filed Japanese Patent Application No. 62-328233.

The gist of the method disclosed in the afore-mentioned Japanese Patent Application No. 62-328233 is to foresee the variation in defocus attributable to the movement of an object and apply a correction to the amount of lens driving (hereinafter referred to as the pursuit correction), in view of the detected defocus variation in each said cycle and the time interval between the cycles. From viewpoint of the focus accuracy at the end of lens driving, this method is expected to alleviate the above-noted problem.

However, when the aforementioned pursuit correction is actually made, there arises the following problem.

When an object is being pursued in the pursuit correction mode, if the object in the distance measuring field shifts to another object, the continuity of the change in the imaging plane position is lost. Therefore, when foreseeing is done on the basis of the data of the old object and the data of the new object, the foreseeing will be wrong with a result that the lens is driven to an entirely different location.

When the object in the distance measuring field thus shifts to another object incorrect foreseeing is performed and this that it problem that it is not eliminated as long as foreseeing control is effected by the use of the data of the old object.

The operation of the device shown in the aforementioned Japanese Patent Application will hereinafter be described with reference to the accompanying drawings.

FIG. 2 is a graph for illustrating the lens driving correction method shown in the aforementioned Japanese Patent Application. In FIG. 2, the horizontal axis represents time t, and the vertical axis represents the imaging plane position x of an object.

The curve x(t) indicated by a solid line represents the imaging plane position, at time t, of an object which comes close to the camera in the direction of the optic axis when the photo-taking lens is at infinity. The curve l(t) indicated by a broken line represents the position of the photo-taking lens at time t, and the lens becomes in focus when x(t) and l(t) coincide with each other. [ti, ti'] represents the focus detecting operation, and [ti', ti+1] represents the lens driving operation. In the example of the prior art shown in FIG. 2, it is assumed that the imaging plane position changes in accordance with a quadratic function. That is, if the current and past three imaging plane positions $(t_1, x_1)$, $(t_2, x_2)$ and $(t_3, x_3)$ are known at time $t_3$, the imaging plane position $x_4$ at time $t_4$ after TL (AF time-lag + release time-lag) from time $t_3$ can be foreseen on the basis of the equation $x(t) = at^2 + bt + c$.

However, what can actually be detected by the camera are not the imaging plane positions $x_1$, $x_2$ and $x_3$, but the defocus amounts $DF_1$, $DF_2$, $DF_3$ and the amounts of lens driving $DL_1$ and $DL_2$ as converted into amounts of movement of the imaging plane. In addition, the time $t_4$ is a value in the future and actually, it is a value which varies as the accumulation time of an accumulation type sensor is varied by the illuminance of the object, but here it is assumed as follows for simplicity:

$$t_4 - t_3 = TL = TM_2 + \text{(release time-lag)} \quad (1)$$

Under the above-mentioned assumption, the amount of lens driving $DL_3$ calculated from the result of the focus detection at the time $t_3$ can be found as follows:

$$x(t) = at^2 + bt + c \quad (2)$$

If $(t_1, l_1)$ in FIG. 2 is regarded as the origin, $$t_1 = 0 \quad x_1 = DF_1 \quad (3)$$

$$t_2 = TM_1 \quad x_2 = DF_2 + DL_1 \quad (4)$$

$$t_3 = TM_1 + TM_2 \quad x_3 = DF_3 + DL_1 + DL_2 \quad (5)$$

By substituting the equations (3), (4) and (5) into the equation (2), a, b and c are found as follows:

$$a = \frac{DF_3 + DL_2 - DF_2}{(TM_1 + TM_2) \cdot TM_2} + \frac{DF_1 - DL_1 - DF_2}{(TM_1 + TM_2) \cdot TM_1} \quad (6)$$

$$b = \frac{DF_2 + DL_1 - DF_1 - a \cdot TM_1^2}{TM_1} \quad (7)$$

$$c = DF_1 \quad (8)$$

Consequently, the amount of lens driving $DL_3$ as converted into the amount of movement of the imaging plane at the time $t_4$ is found as follows:

$$DL_3 = x_4 - l_3 \tag{9}$$
$$= x_4 - x_3 + DF_3$$
$$= a\{(TM_1 + TM_2 + TL)^2 - (TM_1 + TM_2)^2\}$$
$$+ b \cdot TL + DF_3$$

A problem arising when the object in the distance measuring field shifts to another object will now be described with reference to FIG. 3.

FIG. 3 shows the relation between time and the imaging plane position, and in this figure, the solid line represents the imaging plane position of a first object, and the dot-and-dash line represents the imaging plane position of a second object.

Here, let it be assumed that at times $t_1$ and $t_2$, focus detection is effected for the first object and the lens is driven and at time $t_3$, focus detection is effected for the second object.

Thereupon, on the camera side, the imaging plane positions $x_1$, $x_2$ and $x_3'$ at the times $t_1$, $t_2$ and $t_3$, respectively, are calculated from the defocus amount and the amount of lens driving obtained by focus detection, and a quadratic function f(t) passing through $(t_1, x_1)$, $(t_2, x_2)$ and $(t_3, x_3')$ is calculated, and the imaging plane position $x_4''$ at time $t_4$ is foreseen on the basis of this f(t).

However, the imaging plane position of the first object at the time $t_4$ is $x_4$ and the imaging plane position of the second object at the time $t_4$ is $x_4'$, and $x_4''$ obtained by foreseeing is a position differing from the imaging plane positions of both objects.

This is because to foresee the imaging plane position $x_4$ of the first object, it is necessary to find a function passing through $(t_1, x_1)$, $(t_2, x_2)$ and $(t_3, x_3)$, and to foresee the imaging plane position $x_4'$ of the second object, it is necessary to find a function passing through $(t_1, x_1')$, $(t_2, x_2')$ and $(t_3, x_3')$.

On the camera side, however, the first object and the second object cannot be distinguished from each other and therefore, foreseeing calculation is effected by the use of the defocus amount obtained at the time $t_3$ by focus detection. As a result, the foreseeing function is neither an approximate function of the imaging plane position of the first object nor an approximate function of the imaging plane position of the second object, and the foreseen lens driving position is wrong. This is a problem which arises whenever the photographer changes over the main object to the second object while pursuing the first object because the wrong foreseeing as described above takes place when the data, of the focus detection effected for the object other than the main object exists in the data used for foreseeing.

A countermeasure for such a problem is disclosed in previously filed Japanese Patent Application No. 62-328233 or Japanese Laid-Open Patent Application No. 62-139511 or Japanese Laid-Open Patent Application No. 62-139512. The gist of the techniques disclosed in these applications is to immediately discontinue the pursuit mode when a condition unsuitable for foreseeing occurs, such as the loss of the continuity of the change in the imaging plane position or low illuminance of the object.

However, the prior-art system has suffered from the problem that when, contrary to the photographer's intention, the other object has been distance-measured due to camera shake or the interruption of the other object, foreseeing calculation is inhibited by this erroneously distance-measured data and foreseeing control cannot be resumed until the accumulation of predetermined data is computed, whereby the shutter chance is missed.

SUMMARY OF THE INVENTION

One aspect of the present invention is to provide, in a multi-point distance measuring device which effects distance measurement at a plurality of different distance measuring points, an auto focusing device in which the amount of lens driving for making a lens focus on an object after a predetermined time is foreseeing-calculated on the basis of the past focus adjustment data and the latest focus data. Among the focus data at said plurality of distance measuring points, the data suitable for said foreseeing calculation is selected and said foreseeing calculation effected. The invention also pertains to a camera provided with such an auto focusing device.

Another aspect of the present invention is to provide, under the above object, an auto focusing device in which, among the focus data at said plurality of distance measuring points, data indicative of an object characteristic similar to the object characteristic represented by the focus data used in the previous focus adjustment are selected, and foreseeing calculation is effected, or a camera provided with such auto focusing device.

A further aspect of the present invention is to provide, in said multi-point distance measuring device, an auto focusing device in which a selection circuit is provided for selecting data indicative of an object characteristic similar to the object characteristic represented by the focus data used in the previous focus adjustment, and lens driving is effected on the basis of said selected data.

Other objects of the present invention will become apparent from the following detailed description of an embodiment thereof taken in conjunction with the accompanying drawings.

BRIEF DESCRIPTION OF THE DRAIWNGS

FIG. 2 illustrates the principle of the lens driving by foreseeing.

Figure 11C:
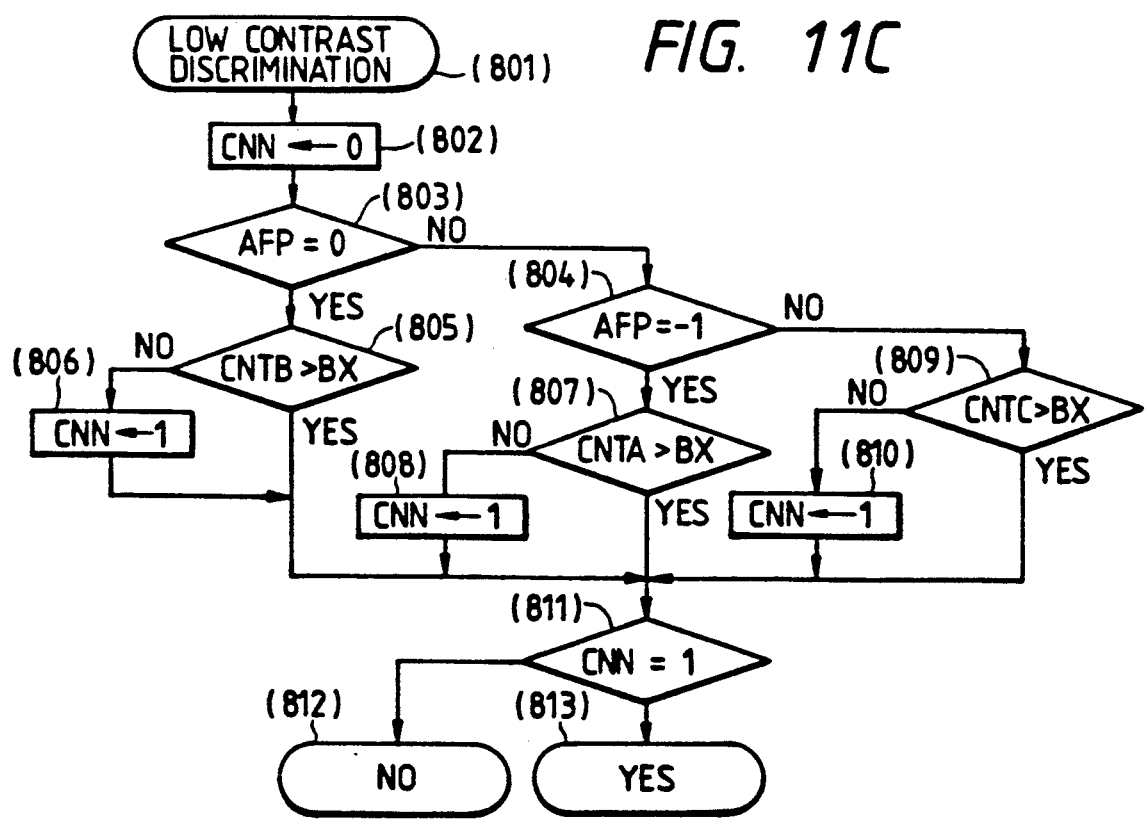
FIG. 11A shows the flow chart of another "foreseeing calculation" sub-routine.
Figure 11A:
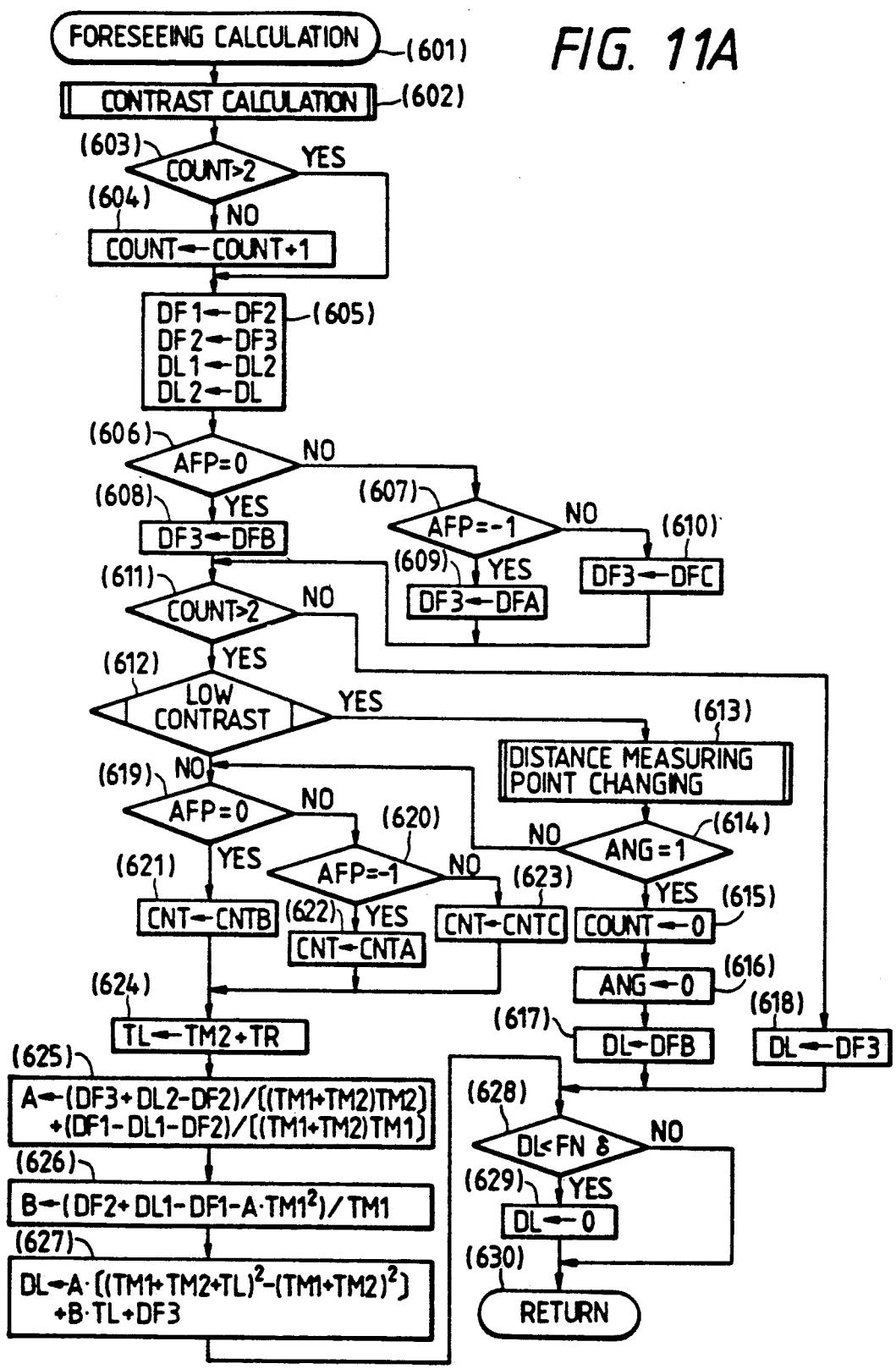

FIGS. 11-B1 and 11-B2 show the flow chart of the "distance measuring point changing" sub-routine of FIG. 11A.

Figures 1, 11B:
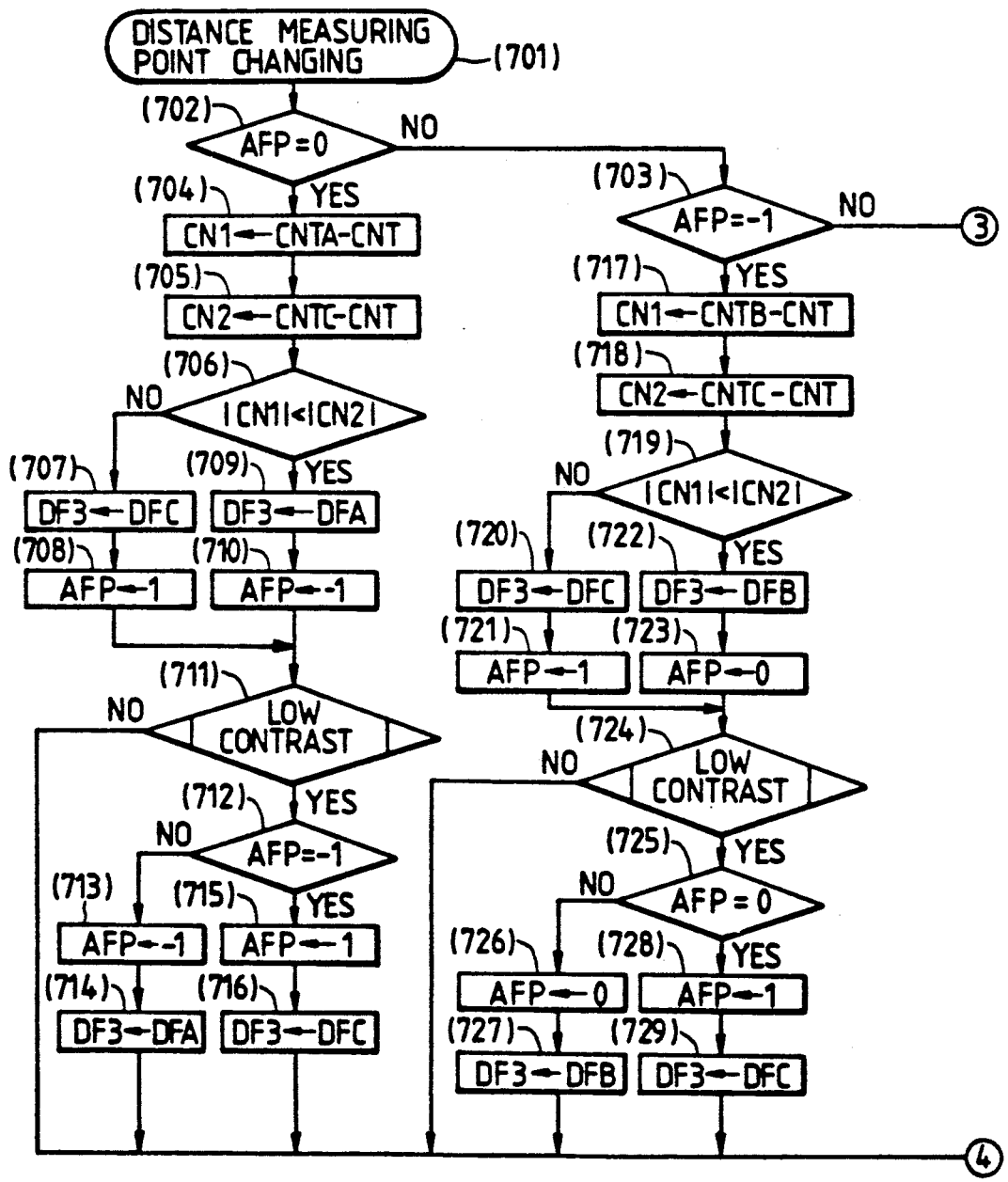
Figures 2, 11B:
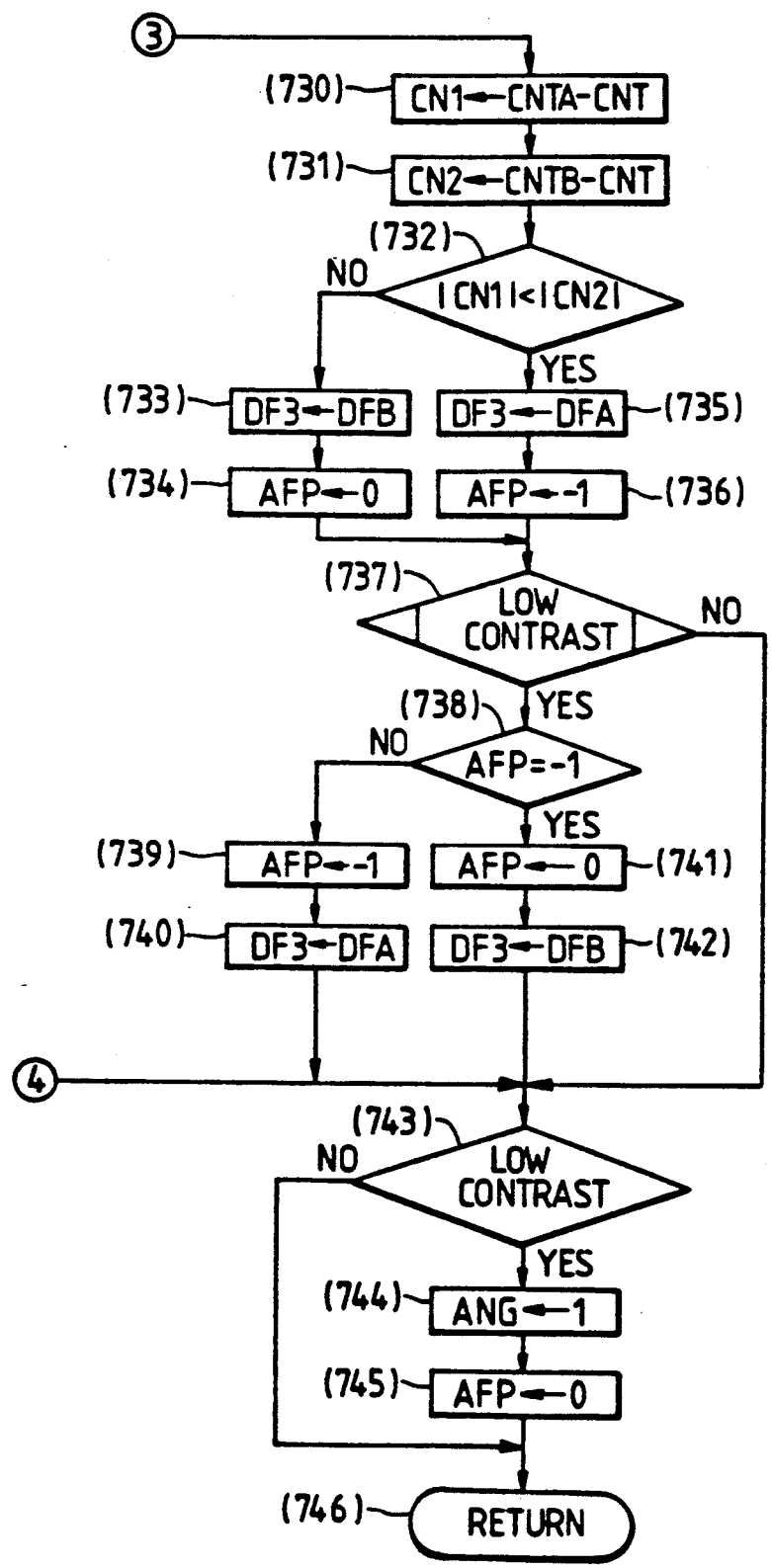

FIG. 11C shows the flow chart of the "low contrast discrimination" sub-routine of FIGS. 11A and 11B.

FIG. 12A shows the flow chart of another "foreseeing calculation" sub-routine.

Figure 1A:
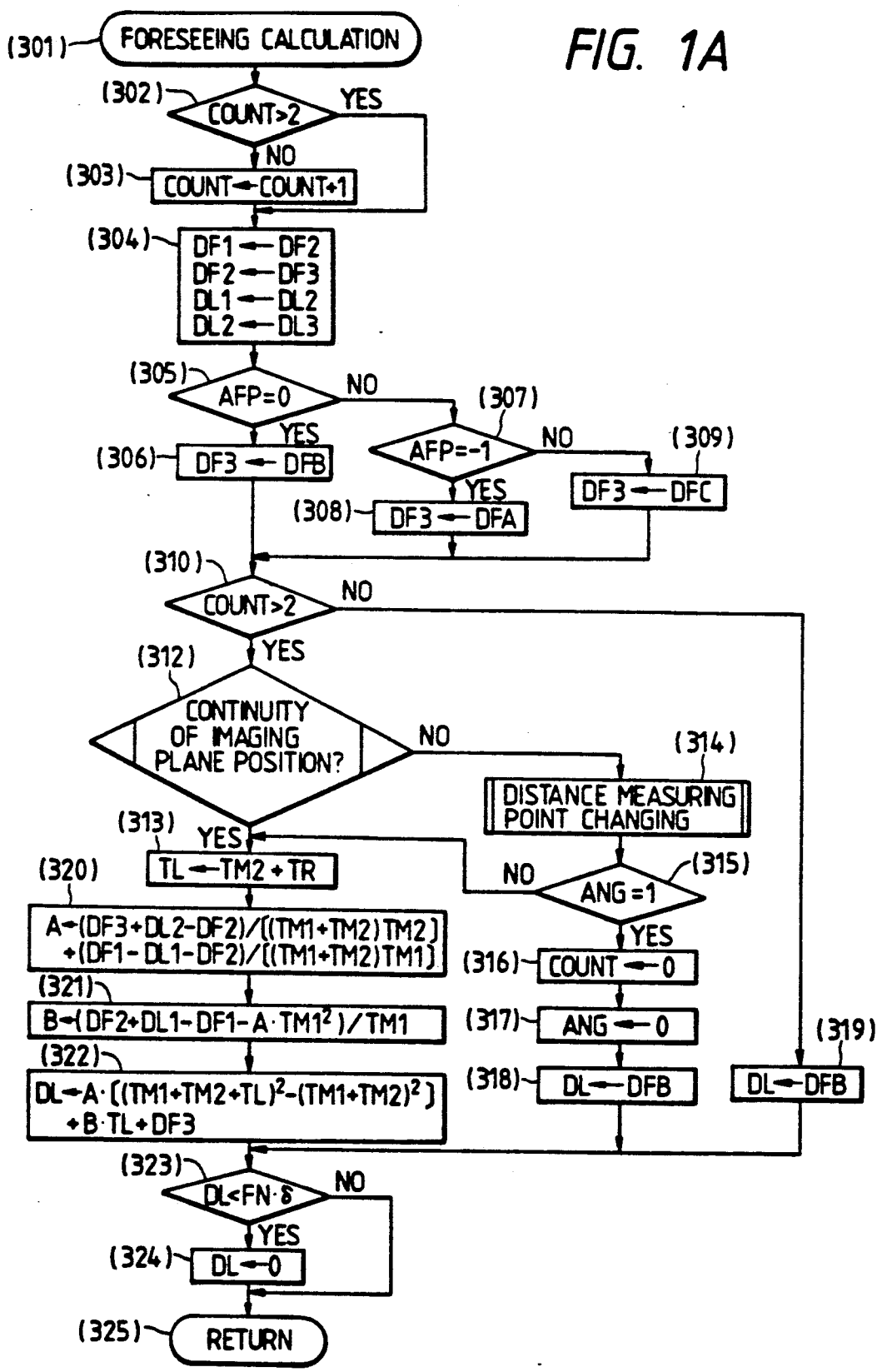
FIG. 1A shows the flow chart of the "foreseeing calculation" sub-routine as a control flow in a focus adjusting device according to the, present invention.
Figures 1, 1B, 2:
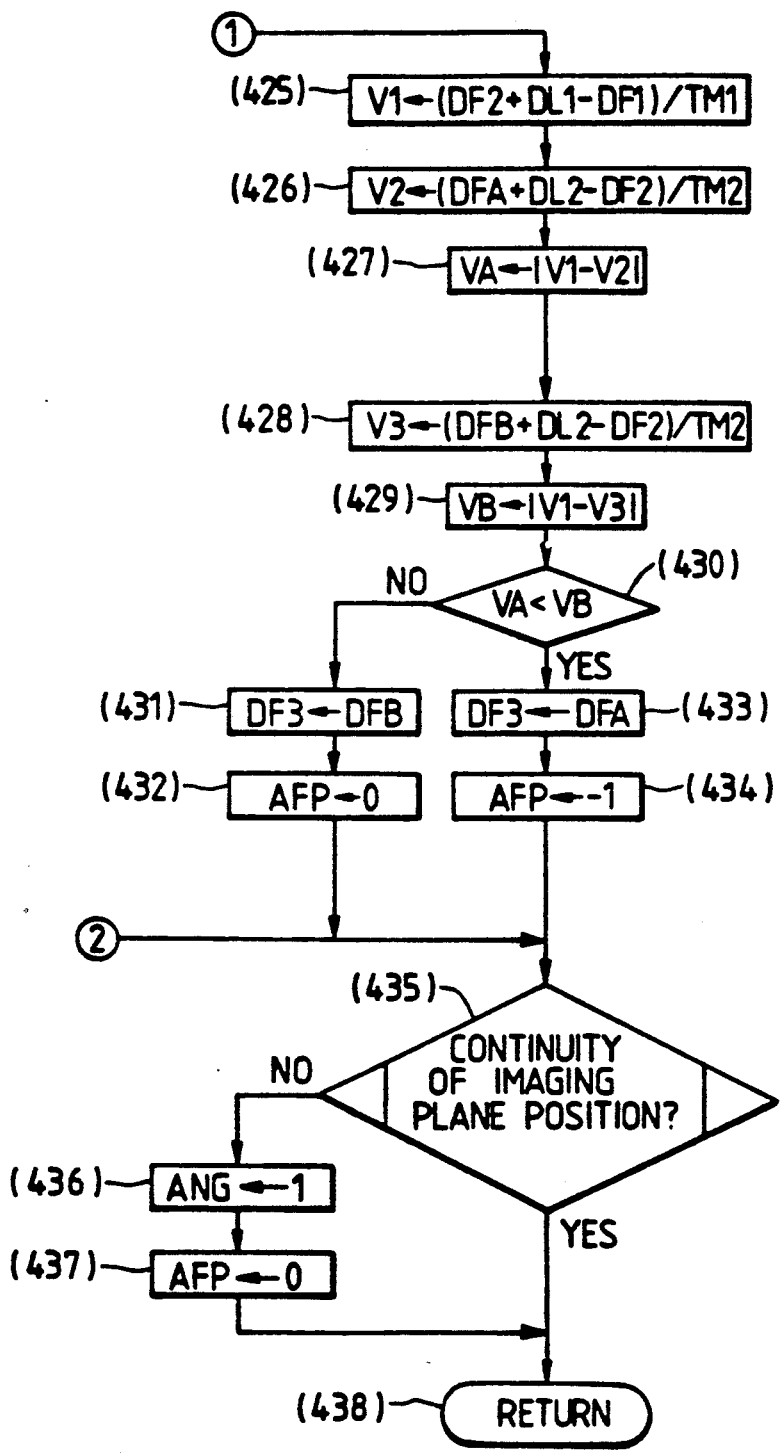
FIGS. 1B-1 and 1B-2 show the flow chart of the "distance measuring point changing" sub-routine of FIG. 1A.
Figure 2:
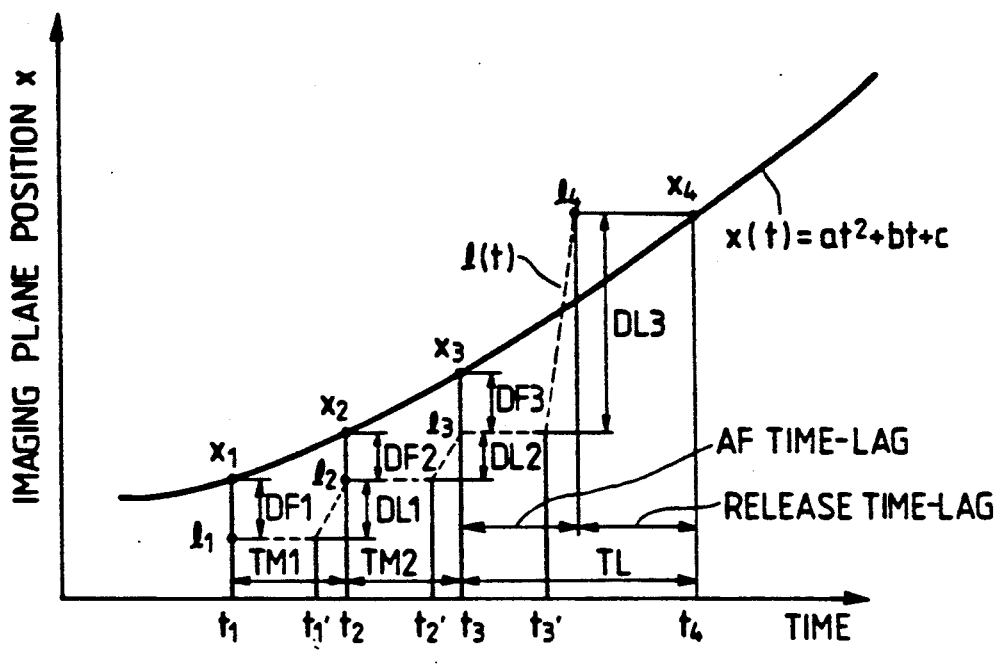
Figure 3:
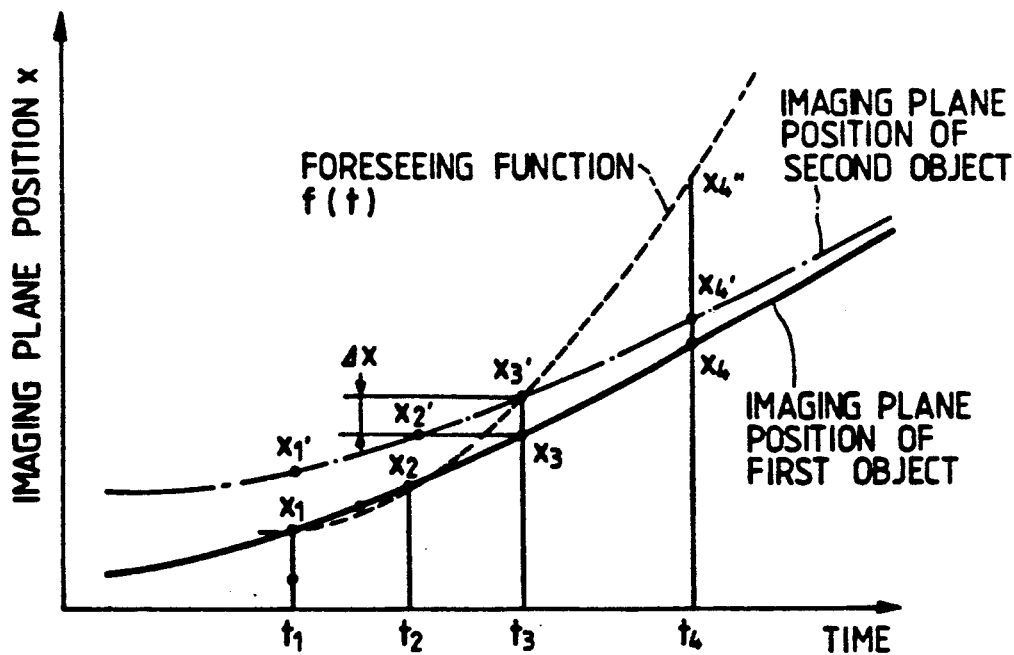
FIG. 3 illustrates a problem in the lens driving by the principle of FIG. 2.
Figures 2, 12B:
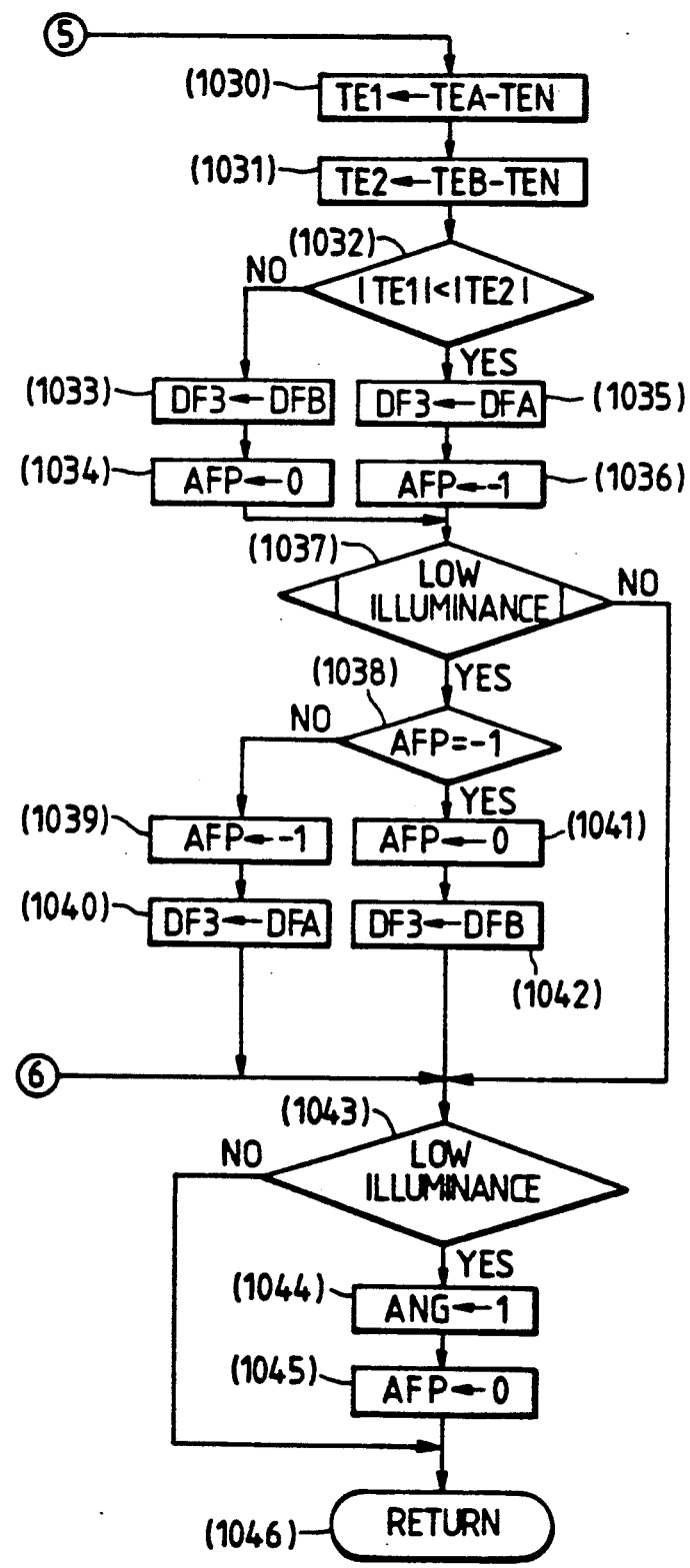

FIGS. 12B-1 and 12B-2 show the flow chart of the "distance measuring point changing" sub-routine of FIG. 12A.

Figure 12C:
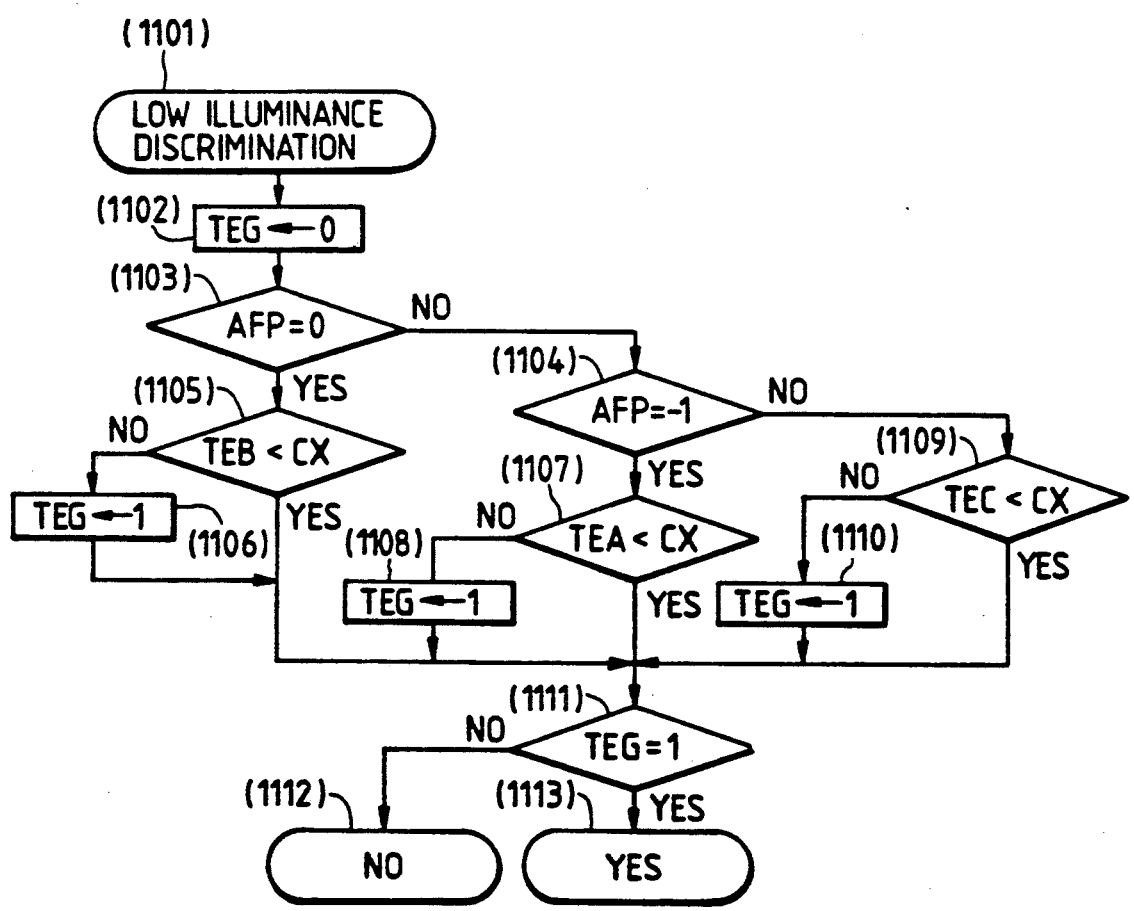

FIG. 12C shows the flow chart of the "low illuminance discrimination" sub-routine of FIGS. 12A and 12B.

Figure 13A:
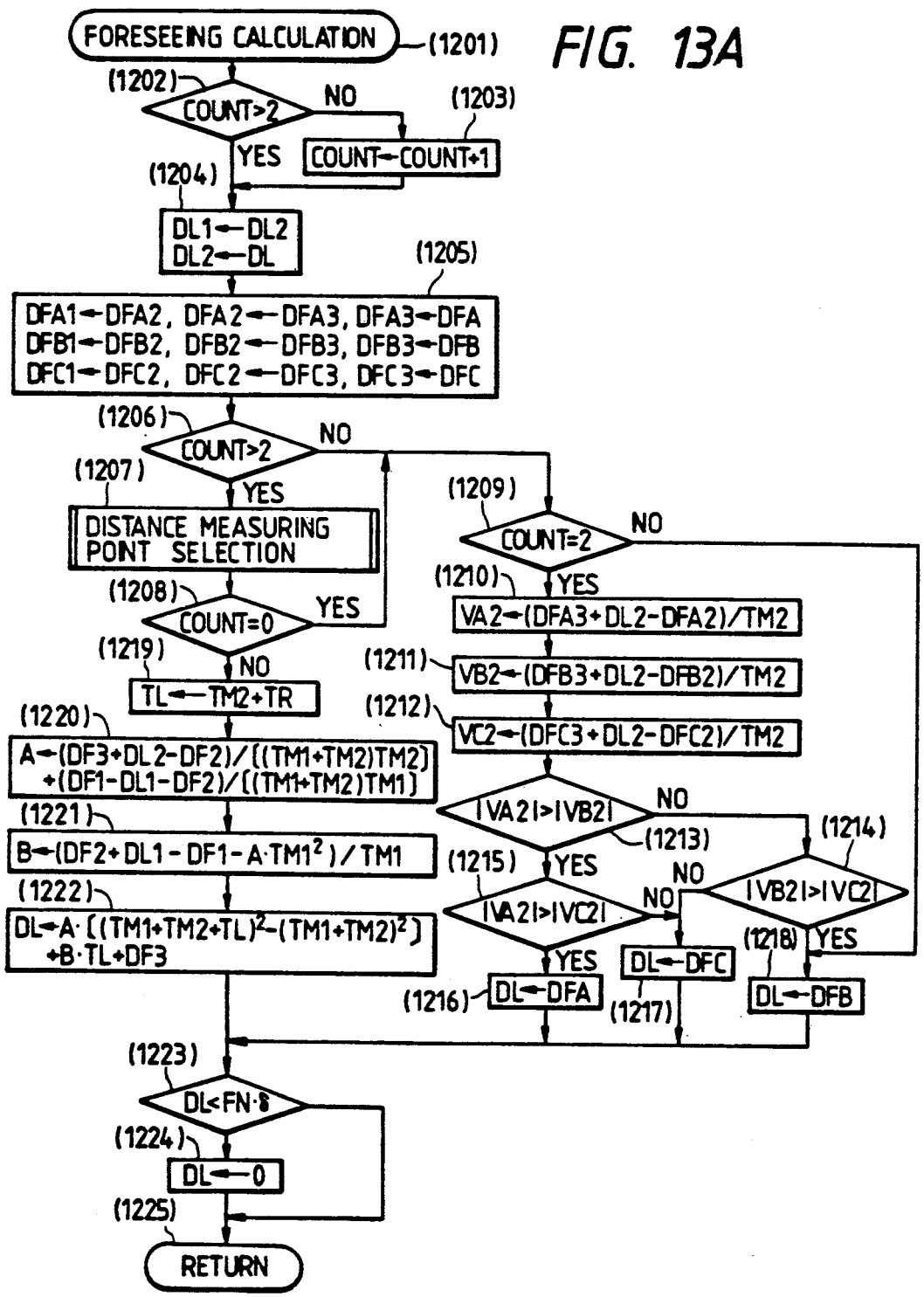

FIG. 13A shows the flow chart of another "foreseeing calculation" sub-routine.

Figure 13B:
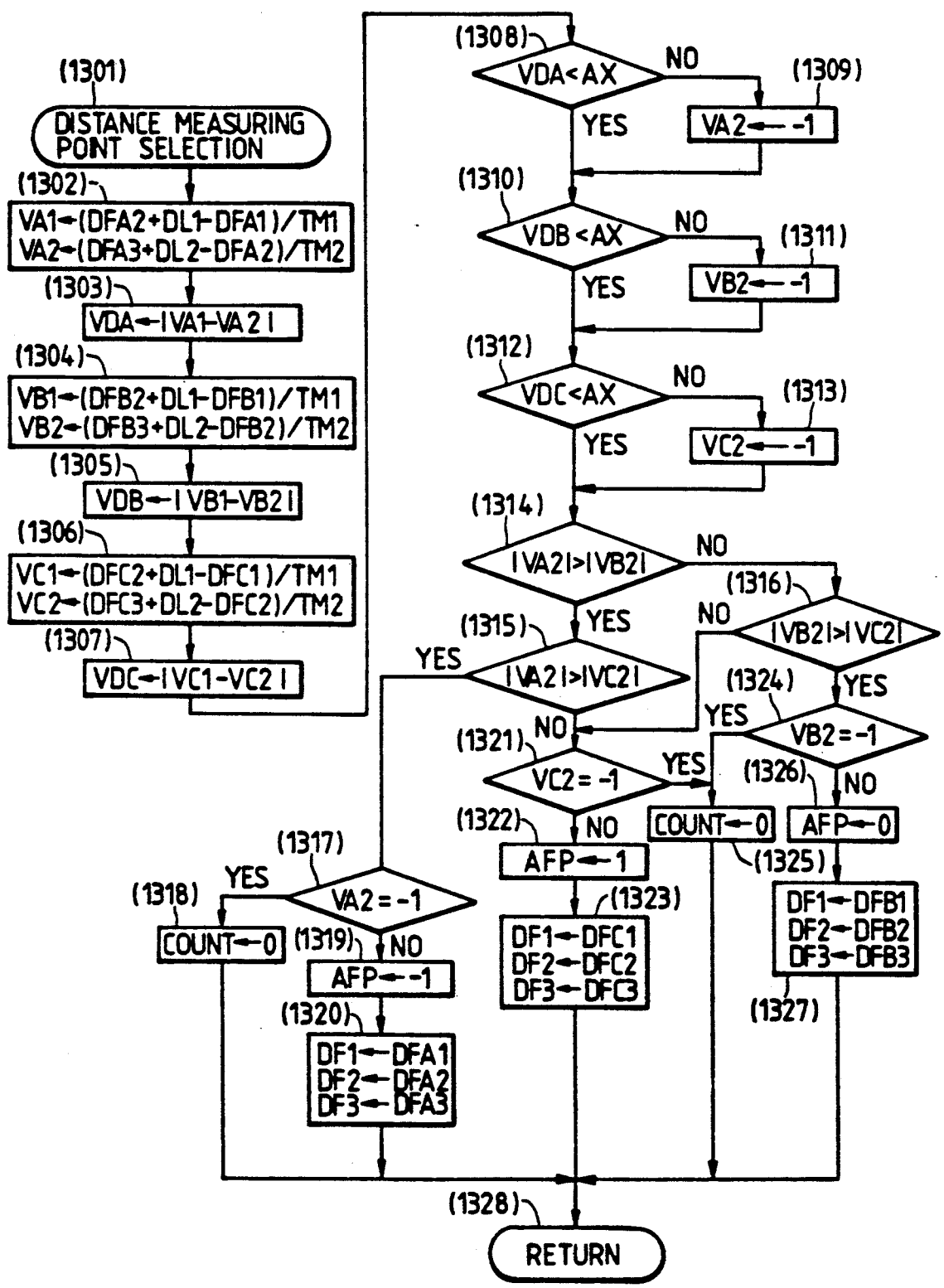

FIG. 13B shows the flow chart of the "distance measuring point selection" sub-routine in FIG. 13A.

DESCRIPTION OF THE PREFERRED EMBODIMENTS

The present invention will hereinafter be described. As an embodiment of the present invention, a description will first be given of a case where an automatic focus adjusting device having a focus detecting system capable of accomplishing distance measurement at three points, i.e., the middle and the right and left of the finder.

Figure 8A:
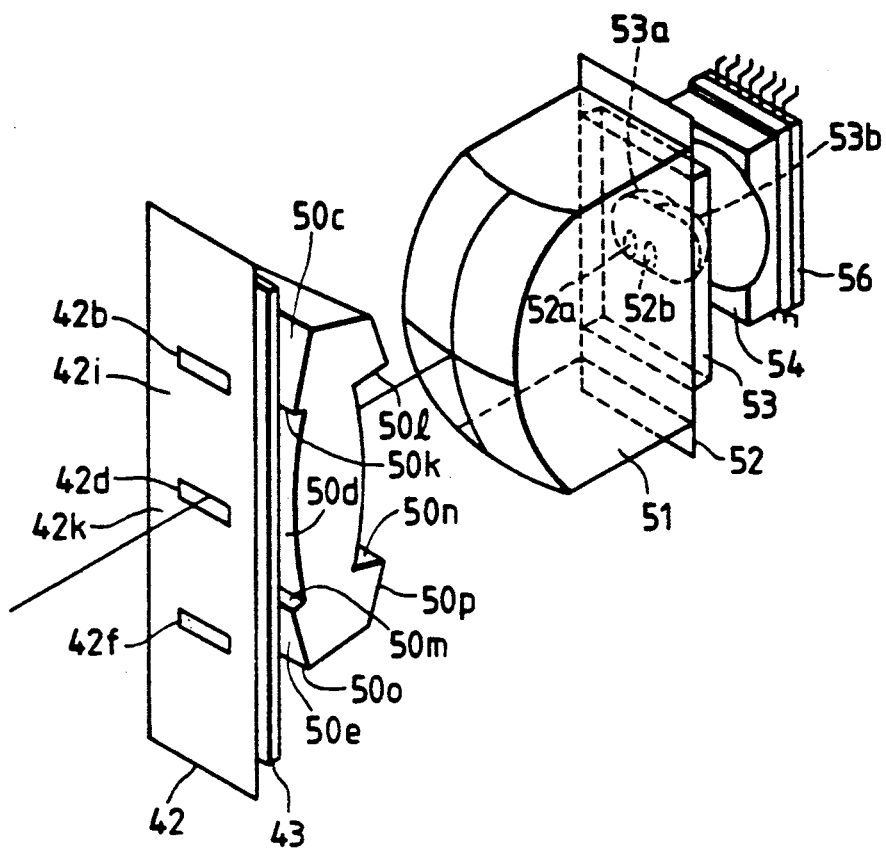
FIGS. 8A and 8B illustrate the structure of a focus detecting device which is an embodiment of the present invention.
Figure 8B:
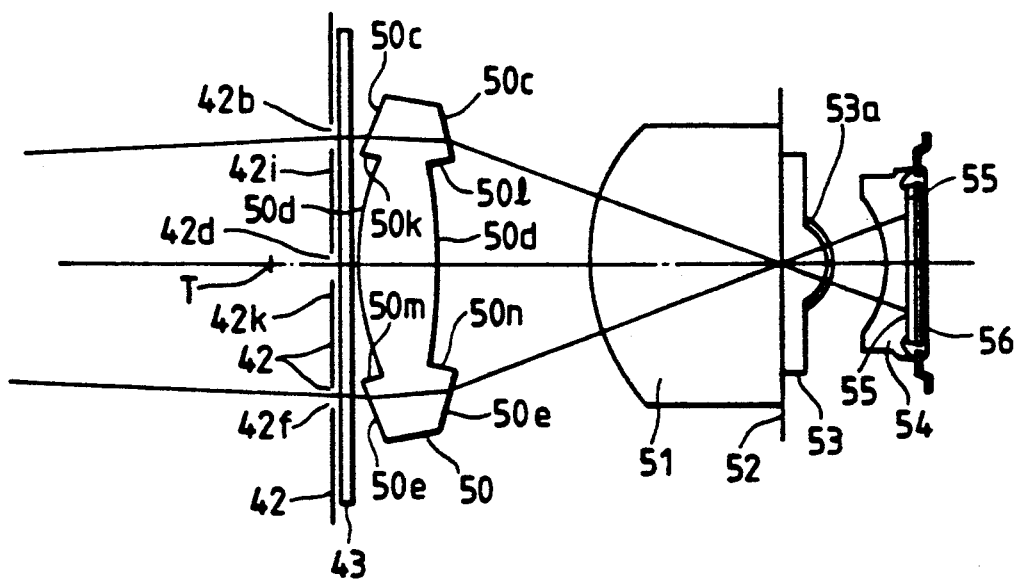

FIGS. 8A and 8B are optical arrangement views showing an embodiment of a focus detecting device capable of accomplishing focus detection at said three points.

FIG. 8A shows a perspective view, and FIG. 8B shows a longitudinal cross-sectional view.

In FIGS. 8A and 8B the reference numeral 42 designates a multi-aperture field mask having longer sides in a lateral direction and provided with juxtaposed rectangular openings and disposed near the predetermined imaging plane of an objective lens. The reference numeral 43 denotes a filter for intercepting any light of longer wavelength than the near-infrared light, and the reference numeral 50 designates a dividing field lens disposed in somewhat deviated relationship with the predetermined imaging plane of the objective lens. The dividing field lens 50, as will be described later, comprises lens portions 50c, 50d and 50e differing in optical action from one another, and these portions are formed by changing the lens thickness or one or both of the radii of curvature of the lens surfaces. Where the lens portions are constructed discretely from one another, they can be made of materials differing in refractive index.

The reference numerals 51 and 53 designate a convex lens and a two-image forming lens which together constitute a re-imaging lens unit with a two-opening stop 52 interposed therebetween. The convex lens 51 converts the incident light into a state approximate to a parallel light flux (the optical action thereof being described in Japanese Patent Publication No. 62-33564), and the two-image forming lens 53 comprising two convex lenses 53a and 53b joined together forms two secondary images of the object image formed by the objective lens. The two-opening stop 52 is provided with vertically elongated elliptical openings 52a and 52b arranged in the lateral direction as viewed in FIG. 8A.

The reference numeral 54 denotes a concave lens for correcting curvature of the field. The concave lens 54 is disposed on a transparent plastic package 56 containing a photoelectric converting device 55 therein. The dividing field lens 50, the convex lens 51 of the re-imaging lens unit, and the concave lens 54 are vertically elongated, but any of these lenses is a rotation-symmetrical spherical lens system.

The light fluxes passed through the openings 42b, ..., 42f in the multi-aperture field mask 42 are transmitted through the lens portions 50c, 50d and 50e of the dividing field lens 50 as shown in FIG. 8B, and form secondary images of the object on the photoelectric converting device.

These secondary images have their relative position changed by the focusing state of the objective lens (the photo-taking lens). These secondary images are converted into image signals by the photoelectric converting device, and the focus state of each distance measuring point is detected from these image signals.

Figure 4:
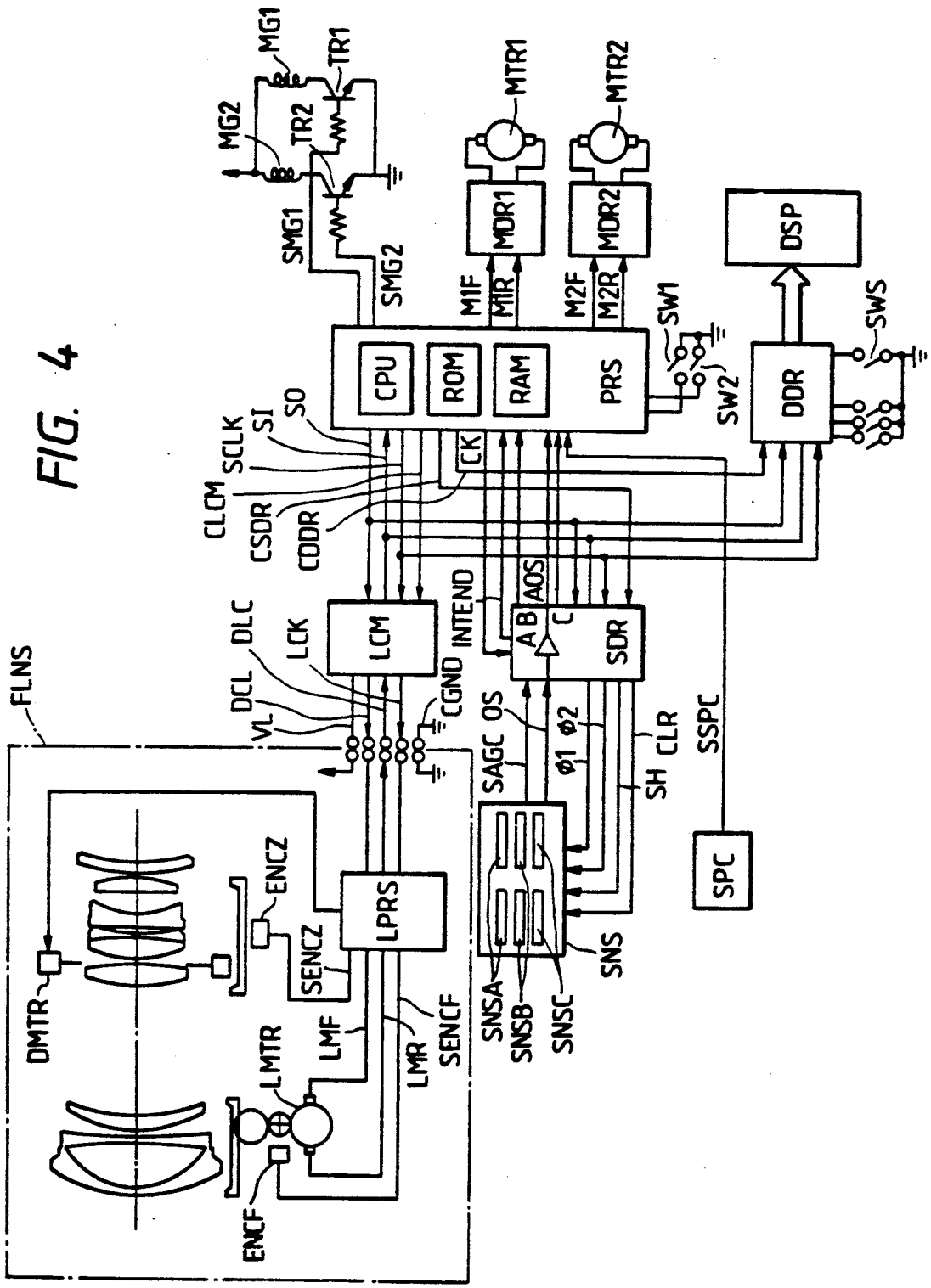
FIG. 4 is a circuit diagram showing an embodiment of the focus adjusting device according to the present invention.

FIG. 4 is a circuit diagram showing an embodiment of a camera provided with the auto focusing device according to the present invention.

In FIG. 4, PRS designates the control device of the camera. The control device PRS is, for example, a one-chip microcomputer having therein a CPU (central processing unit), a ROM, a RAM and an A/D converting function. The computer PRS performs a series of operations for the camera such as an automatic exposure controlling function, automatic an focus detecting function, and a film winding-up function in accordance with the sequence program of the camera stored in the ROM. For that purpose, the computer PRS uses signals for synchronous communication SO, SI and SCLK and communication selection signals CLCM, CSDR and CDDR to communicate with the surrounding circuits and the lens in the camera body and control the operations of each circuit and the lens.

SO is a data signal output from the computer PRS, SI is a data signal input to the computer PRS, and SCLK is a synchronizing clock for the signals SO and SI.

LCM designates a lens communication buffer circuit which supplies electric power to a power source terminal for the lens when the camera is in operation and which provides a communication buffer between the camera and the lens when the selection signal CLCM from the computer PRS is at a high potential level (hereinafter referred to as 'H').

That is, when the computer PRS renders CLCM into 'H' and delivers predetermined data from SO in synchronism with SCLK, the lens communication buffer circuit LCM outputs buffer signals LCK and DCL for SCLK and SO, respectively, to the lens through the contact between the camera and the lens. Simultaneously therewith, it outputs a buffer signal for the signal DLC from the lens as SI, and the computer PRS inputs said SI as the data from the lens in synchronism with SCLK.

SDR denotes a driving circuit for a line sensor device SNS for focus detection comprised of a CCD or the like, and the driving circuit SDR is selected when the signal CSDR is 'H', and is controlled from the computer PRS by the use of SO, SI and SCLK.

A signal CK is a clock signal for producing CCD driving clock signals $\phi_1$ and $\phi_2$, and a signal INTEND is a signal for informing the computer PRS that the accumulating operation has been completed.

The output singal OS of the line sensor device SNS is a time-serial image signal synchronized with the clocks $\phi_1$ and $\phi_2$, and is amplified by an amplifier circuit in the driving circuit SDR, whereafter it is output as AOS to the computer PRS. The computer PRS receives AOS as an input from the analog input terminal thereof, and A/D-converts it by the A/D converting function therein and stores it in a predetermined address of the RAM.

SAGC which also is the output signal of the sensor for AGC (auto gain control) in the sensor device SNS, and is input to the driving circuit SDR for use for the image signal accumulation control in the sensor device SNS.

SPC designates a photometric sensor for exposure control which receives the light from the object passed through the photo-taking lens, and the output SSPC thereof is input to the analog input terminal of the computer PRS and is A/D-converted, whereafter it is used for automatic exposure control (AE) in accordance with a predetermined program.

DDR denotes a switch detection and display circuit which is selected when the signal CDDR is 'H', and is controlled from the computer PRS by the use of SO, SI and SCLK. That is, it changes over the display on the display member DSP of the camera on the basis of data sent from the computer PRS, and informs the computer PRS of the ON or OFF state of a switch SWS operatively associated with the various operating members of the camera, by communication.

Switches SW1 and SW2 are switches operatively associated with a release button, not shown, and the switch SW1 is closed by the first-stage depression of the release button, and subsequently the switch SW2 is closed by the second-stage depression of the release button. The computer PRS, as will be described later, performs the photometering and the automatic focus adjusting operation upon closing of the switch SW1, and effects exposure control and film winding-up with the closing of the switch SW2 as a trigger. The switch SW2 is connected to the "interruption input terminal'-',of the microcomputer PRS, and even when the program is being executed during the closing of the switch SW1 interruption is exerted by the closing of the switch SW2 and a shift can be immediately made to a predetermined interruption program.

MTR1 designates a film feeding motor, and MTR2 denotes a motor for driving the mirror up and charging down and shutter spring and the control of the forward and reverse revolutions thereof si effected by their respective driving circuits MDR1 and MDR2. Signals M1F, M1R, M2F and M2R input from the computer PRS to the driving circuit MDR1 and MDR2 are motor controlling signals.

MG1 and MG2 denote magnets for starting the movement of the aperture opening blades and aperture closing blades of the shutter. These magnets are electrically energized by signals SMG1 and SMG2 and amplifying transistors TR1 and TR2, and shutter control is effected by the computer PRS.

The switch detection and display circuit DDR, the motor driving circuits MDR1 and MDR2 and shutter control have no direct relation with the present invention and therefore need not be described in detail.

A signal DCL input to a control circuit LPRS in the lens in synchronism with LCK is command data from the camera to the lens FLNS, and the operation of the lens for the command is predetermined.

The control circuit LPRS in the lens analyzes the command in accordance with a predetermined procedure, and effects the focus adjusting operation, the aperture controlling operation and the outputting of the various parameters of the lens (such as full open F-number, focal length and the coefficient of defocus amount vs. amount of axial movement) from the output DLC thereof.

In the embodiment, there is shown an example of a zoom lens, and when a focus adjustment command is sent from the camera, a focus adjusting motor LMTR is driven by signals LMF and LMR in accordance with the amount and direction of driving sent at the same time, whereby the optical system is moved in the direction of the optic axis to thereby accomplish focus adjustment. The amount of movement of the optical system is monitored by the pulse signal SENCF of an encoder circuit ENCF and counted by a counter in the control circuit LPRS, and at a point of time whereat a predetermined movement is completed, the control circuit LPRS itself renders signals LMF and LMR into 'L' and brakes the motor LMTR.

Therefore, once the focus adjustment command has been sent from the camera, the control device PRS in the camera need not all be concerned with the lens driving until the driving of the lens is completed.

Also, when an aperture control command has been sent from the camera, a stepping motor DMTR, conventional for aperture driving, is driven in accordance with the number of aperture steps sent at the same time. The stepping motor is capable of open control and does not require an encoder for monitoring the operation thereof.

ENCZ designates an encoder circuit annexed to a zoom optical system, and the control circuit LPRS in the lens receives as an input a signal SENCZ from the encoder circuit ENCZ and detects the zoom position. Lens parameters at each zoom position are stored in the control circuit LPRS in the lens, and when there is a demand from the computer PRS of the camera, a parameter corresponding to the current zoom position is delivered to the camrea. Three sets of photoelectric converting devices are provided in the sensor device SNS for respective pairs of images, whereby distance measurement at three points becomes possible.

The operation of the camera of the above-described construction will now be described with reference to the flow charts of FIGS. 5 and so on.

When a power source switch, not shown, is closed, the supply of electric power to the microcomputer PRS is started and the computer PRS starts to execute the sequence program stored in the ROM.

Figure 5:
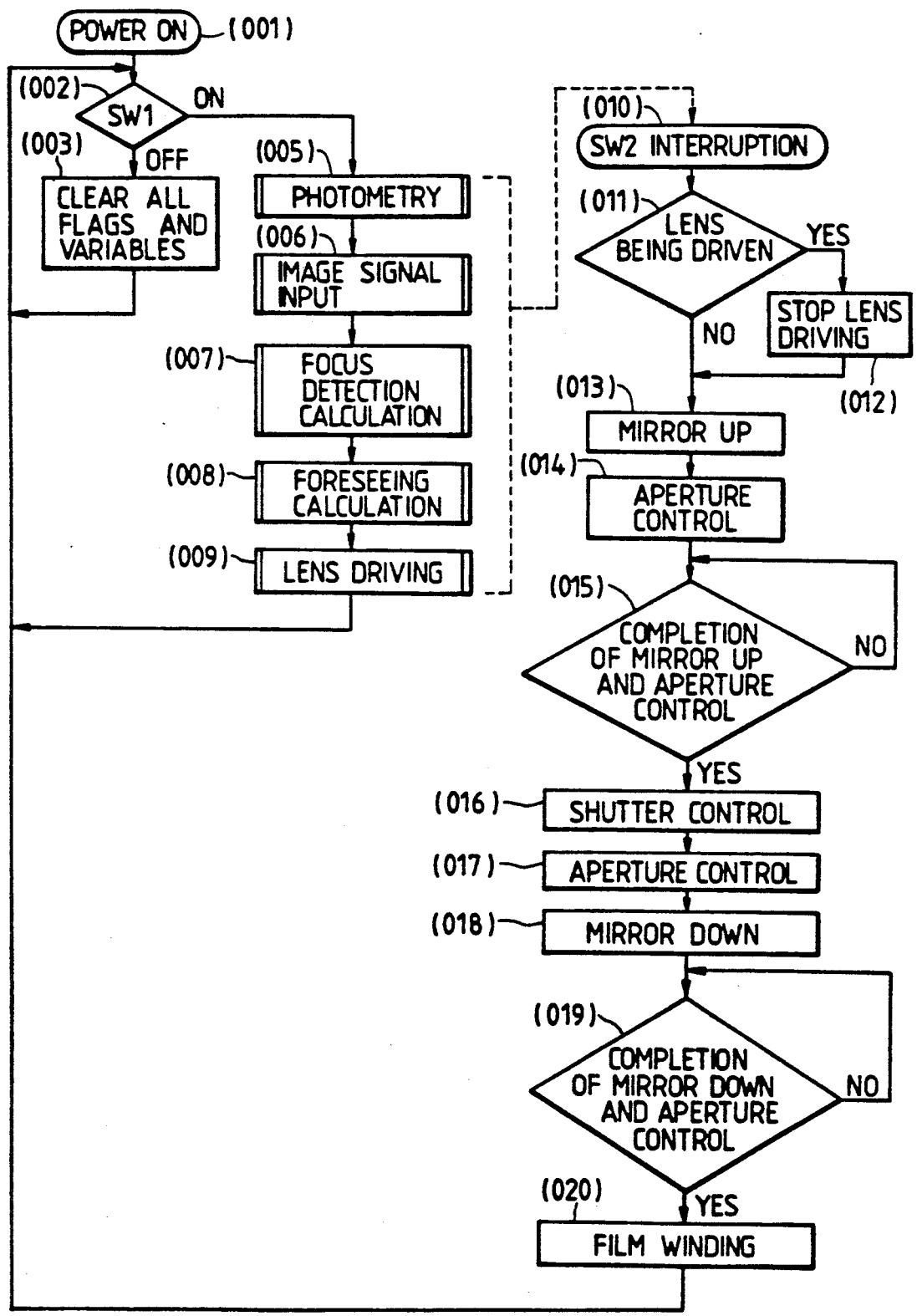
FIG. 5 shows the main flow chart for illustrating the operation of the device of FIG. 4.

FIG. 5 is a flow chart showing the general flow of said program. When the execution of the program is started by said operation, via step (001) and at step (002), the state of the switch SW1 adapted to be closed by the first-stage depression of the release button is detected, and if the switch SW1 is OFF a shift is made to step (003), where all flags and variables for control set in the RAM in the computer PRS are cleared and initialized.

The steps (002) and (003) are repetitively executed until the switch SW1 becomes ON or the power source switch becomes OFF. By the switch SW1 becoming ON, a shift is made from the step (002) to step (005).

At the step (005), the "photometry" sub-routine for exposure control is executed. The computer PRS inputs the output SSPC of the photometering sensor SPC shown in FIG. 4 to the analog input terminal, A/D-converts it, calculates an optimum shutter control value and an optimum aperture control value from the digital photometric value, and stores them in a predetermined address of the RAM. During the release operation, control of the shutter and aperture is effected on the basis of these values.

Figure 6:
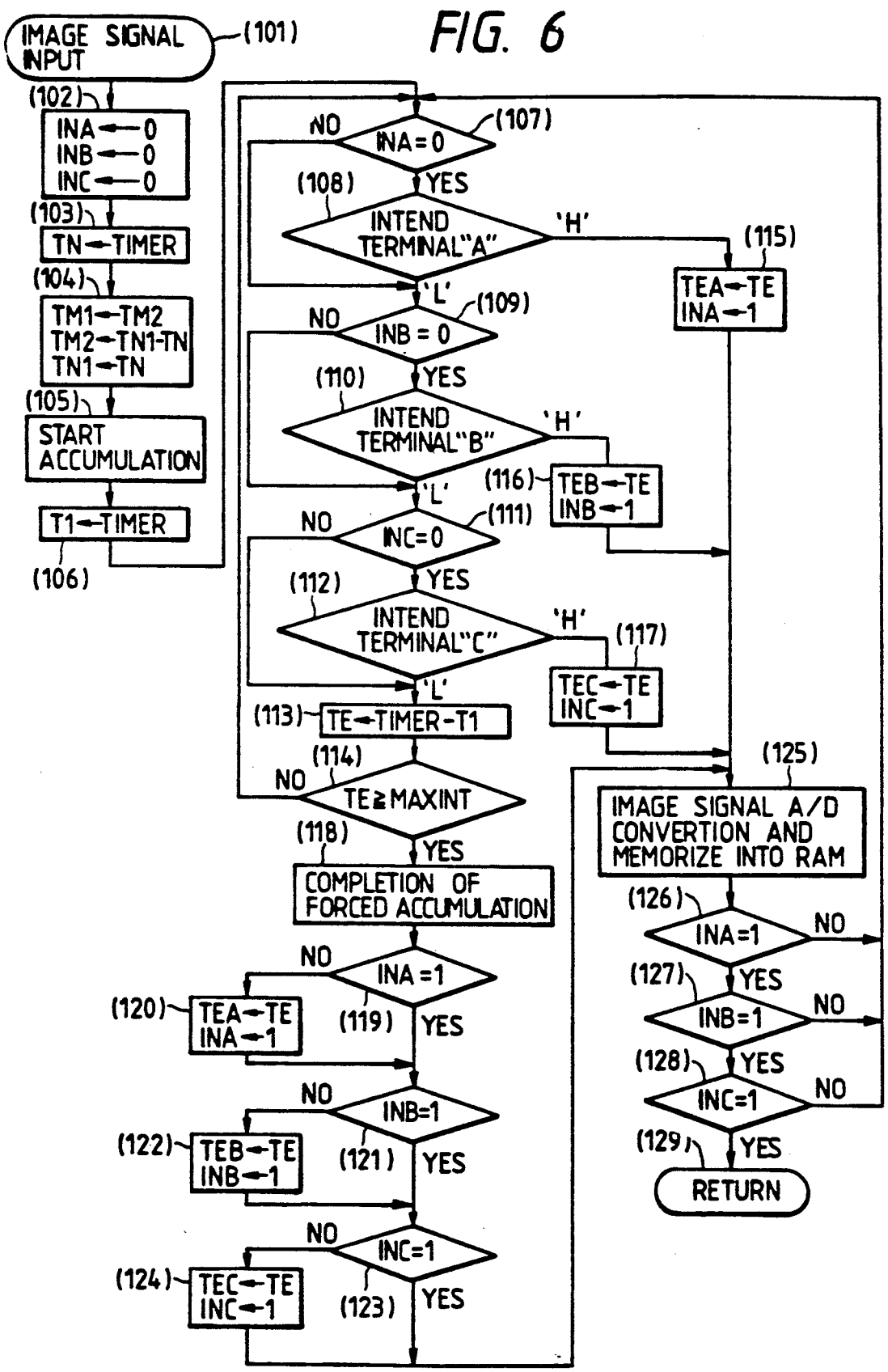
FIG. 6 shows the flow chart of the "image signal input" sub-routine of FIG. 5.

Subsequently, at step (006), the "image signal input" sub-routine is executed. The flow of this subroutine is shown in FIG. 6, and the computer PRS effects the inputting of the image signals of the three sets of sensor arrays of the sensor device SNS for focus detection. The details of this will be described later.

At the next step (007), the defocus amounts DEF of the three distance measuring points based on the respective image signals of the photo-taking lens are calculated on the basis of the three sets of input image signals. A specific calculation method is disclosed in Japanese Patent Application No. 61-160824 by the applicant and therefore need not be described in detail herein.

At step (008), the "foreseeing calculation" sub-routine is executed. In this "foreseeing calculation" sub-routine, correction of the amount of lens driving is effected, and the details thereof will be described later.

Figure 7:
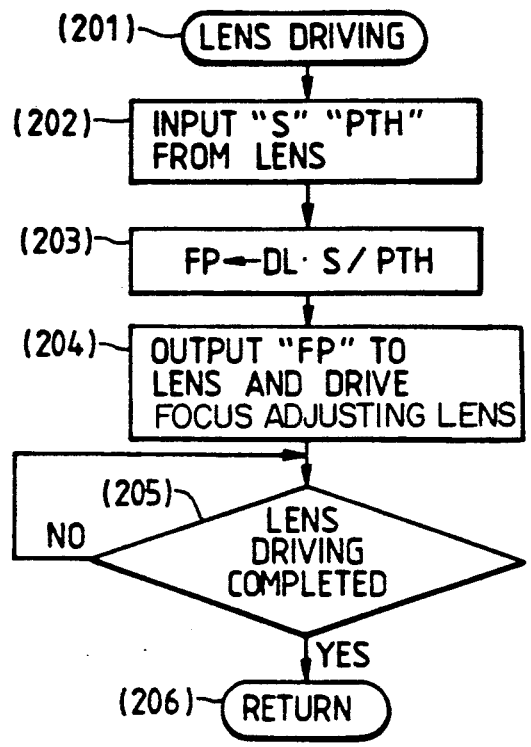
FIG. 7 shows the flow chart of the "lens driving" sub-routine of FIG. 5.

At the next step (009), the "lens driving" subroutine is executed and lens driving is effected on the basis of the amount of lens driving corrected at the previous step (008). The flow of this "lens driving" sub-routine is shown in FIG. 7. After the completion of lens driving, movement is again made to the step (002), and the steps (005)–(009) are repetitively executed until the switch SW1 becomes OFF or the second stroke switch SW2 of a release switch, not shown, becomes ON, and preferable focus adjustment is effected even for a moving object.

Now, when the release button is further depressed to close the switch SW2, a shift is immediately made from any step to step (010) by the interrupting function and the release operation is started.

At step (011), whether lens driving is being executed is discriminated, and if the lens is being driven, a shift is made to step (012), where a lens driving stop command is delivered to stop the lens, and an advance is made to step (013), and if the lens is not being driven, a shift is immediately made to step (013).

At the step (013), the quick return mirror of the camera is moved up. This is executed by controlling the motor controlling signals M2F and M2R shown in FIG. 4. At the next step (014), the aperture control value already stored by the photometry sub-routine of the step (005) is delivered as the signal SO to the control circuit LPRS in the lens through the circuit LCM to effect aperture control.

Whether the mirror has been moved up and aperture has been controlled in the steps (013) and (014) is detected at step (015), and the mirror movement can be confirmed by a detection switch, not shown, which is annexed to the mirror. As regards the aperture control, whether the lens has been driven to a predetermined aperture value is confirmed by communciation. If either the mirror has not been moved, or the aperture has not been controlled the program waits at this step and detection of the completion state is continuedly effected. When the completion of the two is confirmed, a shift is made to step (016).

At the step (016), control of the shutter is effected at the shutter time already stored by the photometry sub-routine of the step (005) and the film is exposed.

When the control of the shutter is completed, at the next step (017), a command for making the aperture fully open is sent to the lens by the aforementioned communication operation, and subsequently at step (018), the mirror is moved down. The mirror movement down, like the mirror movement up, is executed by controlling the motor MTR2 by the use of the motor controlling signals M2F and M2R.

At the next step (019), as at the step (015), the completion of the mirror movement down and the aperture being opened is waited for. When movement of both the mirror and the aperture opening are completed, a shift is made to step (020).

At the step (020), the motor controlling signals M1F and M1R shown in FIG. 4 are properly controlled, whereby the film is wound up by one frame.

What has been described above is the general sequence of the camera in which foreseeing AF is carried out.

The 637 image signal input" sub-routine shown in FIG. 6 will now be described.

The "image signal input" is an operation executed at the beginning of a new focus detecting operation, and when this sub-routine is called, via step (101) and at step (102), flags INA, INB and INC are reset. These flags are for discriminating whether the accumulation by the three sets of line sensors as photoelectric converting devices for distance-measuring the three points) has been completed and therefore, they are first reset before the accumulation is started.

When the step (102) is completed, a shift is made to step (103). At this step (103), the timer value TIMER of the self-running timer of the microcomputer PRS itself is stored into a memory area TN on the RAM, whereby the starting time of the focus detecting operation is memorized.

At the next step (104), the contents of memories $TM_1$ and $TM_2$ which memorize the time intervals $TM_1$ and $TM_2$ in the lens driving amount correction equations (6), (7) and (7) are renewed. Before the step (104) is executed, the time intervals in the before-last and last focus detecting operations are memorized in $TM_1$ and $TM_2$, and the time when the last focus detecting operation has been started is memorized in $TN_1$.

Consequently, by the execution of the step (104), $TN_1$–TN represents the time interval from the last to the current focus detecting operation, and this is input to the memory $TM_2$ and the before-last time interval is memorized in $TM_1$. For the next focus detecting operation, the current focus detection starting time TN is stored in $TN_1$. That is, at the step (104), the before-last time interval, the last time interval and the current focus detection starting time are always stored in the memories $TM_1$, $TM_2$ and $TN_1$, respectively.

Now, at the next step (105), the sensor device SNS is caused to start the accumulation of optical images. Specifically, the microcomputer PRS delivers an "accumulation starting command" to the sensor driving circuit SDR by communication, and in response thereto, the driving circuit SDR changes the clear signal CLR of the photoelectric conversion element portion of the sensor device SNS to 'L' and causes the sensor device to start the accumulation of charges.

At step (106), the timer value of the self-running timer is stored into as a variable TI and the current time is memorized.

At step (107), whether the accumulation by the first line sensor SNSA and the AD conversion of the image signal have been completed is discriminated, and if the accumulation is completed, a shift is made to step (109), and if the accumulation is not yet completed, shift is made to step (108).

At the step (108), the state of the input INTEND terminal A (for the sensor SNSA) of the computer PRS is detected and whether the accumulation has been completed is examined. The sensor driving circuit SDR changes the signal INTEND to 'L' simultaneously with the start of the accumulation, and monitors the AGC signal SAGC from the sensor SNSA of the sensor device SNS, and when this signal SAGC reaches a predetermined level, the sensor driving circuit SDR changes the signal INTEND to 'H' and at the same time, changes a charge transfer signal SH to "H" for a predetermined time and causes the charges in the photoelectric conversion element portion to be transferred to the CCD portion.

If at the step (108), the INTEND terminal A is 'H', it means that the accumulation by the first line sensor SNSA has been completed, and a shift is made to step (115), and if the INTEND terminal A is 'L', it means that the accumulation is not yet completed, and a shift is made to step (109).

At the step (109), whether the accumulation by the second line sensor SNSB and the A/D conversion of the image signal have been completed is discriminated, and if they are completed, a shift is made to step (111), and if not, a shift is made to step (110).

At the step (110), as at the step (108), if the INTEND terminal B is 'H', it means that the accumulation by the second line sensor SNSB has been completed, and a shift is made to step (116), and if the INTEND terminal B is 'L', it means that the accumulation is not yet completed, and a shift is made to step (111).

At the step (111), whether the accumulation by the third line sensor SNSC and the A/D conversion of the image signal have been completed is discriminated, and if they are completed, a shift is made to step (113), and if not, a shift is made to step (112).

At the step (112), as at the step (108), if the INTEND terminal C is 'H', it means that the accumulation by the third line sensor SNSC has been completed, and a shift is made to step (117), and if the INTEND terminal C is 'L', it means that the accumulation is not yet completed, and a shift is made to step (113).

The steps (115), (116) and (117) are steps which are executed when the accumulation by the respective line sensors has been completed, and "1" is input to the accumulation completion flags INA, INB and INC. The accumulation time TE is input to parameters TEA, TEB and TEC representing the accumulation times of the respective line sensors. When these steps are completed, a shift is made to step (125).

At the step (113), the time TI memorized at the step (106) is subtracted from the timer value TIMER of the self-running timer and the result is stored as the variable TE. Thus, the time from after the accumulation has been started till now, i.e., the so-called accumulation time, is stored as the variable TE. At the next step (114), TE is compared with a constant MAXINT, and if TE is less than MAXINT, a return is made to the step (107), where the completion of the accumulation is again waited for. When TE becomes greater than MAXINT, a shift is made to step (118), where the accumulation is forcedly completed. The forced completion of the accumulation is executed by an "accumulation completion command" being delivered from the computer PRS to the circuit SDR. When the "accumulation completion command" is sent from the computer PRS to the circuit SDR, the circuit SDR changes the charge transfer signal SH to "H" for a predetermined time and causes the charges in the photoelectric converting portion to be transferred to the CCD portion. In the flow up to the step (118), the accumulation by the sensors is completed.

At step (119), whether the accumulation by the first line sensor SNSA and the A/D conversion have been completed is discriminated, and if they are completed, a shift is made to step (121), and if not so, a shift is made to step (120).

At the step (121), whether the accumulation by the second line sensor SNSB and the A/D conversion have been completed is discriminated, and if they are completed, a shift is made to step (123), and if not, a shift is made to step (122).

At the step (123), whether the accumulation by the third line sensor SNSC and the A/D conversion have been completed is discriminated, and if they are completed, a shift is made to step (125), and if not, a shift is made to step (124).

At the steps (120), (122) and (124), the accumulation time TE is input to the accumulation times TEA, TEB and TEC of the first, second and third line sensors, respectively, and "1" is input to the accumulation completion flags INA, INB and INC of the respective line sensors.

At step (125), the A/D conversion of a signal AOS obtained by the image signal OS of each line sensor of the sensor device SNS which has completed the accumulation being amplified by the sensor driving circuit SDR and the storage of the digital signal thereof into the RAM are effected. More particularly, the sensor driving circuit SDR produces CCD driving clock signals $\phi 1$ and $\phi 2$ in synchronism with the clock signal CK from the computer PRS and imparts them to the sensor device SNS, which has its CCD portion which has completed the accumulation driven by the clock signals $\phi 1$ and $\phi 2$, and the charge in the CCD is time-serially output as an image signal from the output OS. This signal is amplified by an amplifier in the driving circuit SDR, whereafter it is input as AOS to the analog input terminal of the computer PRS. The computer PRS effects A/D conversion in synchronism with the clock CK output by itself, and stores the digital image signal after A/D-conversion at a predetermined address of the RAM.

At steps (126)–(128), whether the accumulation by each line sensor and the A/D conversion have been completed is discriminated, and if the accumulation by all line sensors and the A/D conversion are completed, shift a is made to step (129) and this sub-routine is returned to, and if said accumulation and the A/D conversion are not completed, shift a is made to step (107), and there the accumulation by the line sensors which have not completed the accumulation is continued.

FIG. 7 shows the flow chart of the "lens driving" sub-routine.

When this sub-routine is executed, at step (202), communication is effected with the lens and two data "S" and "PTH" are input. "S" is the "coefficient of the defocus amount vs. the amount of axial movement of the focus adjusting lens" intrinsic to the photo-taking lens. For example, in the case of a totally axially moved type single lens, the entire photo-taking lens is a focus adjusting lens and therefore, S=1. In the case of a zoom lens, as in the present embodiment, each zoom position is detected by the encoder circuit ENCZ and S conforming to the zoom position is determined by the control circuit LPRS. "PTH" is the amount of axial movement of the focus adjusting lens LNS per one pulse of the output pulses from the encoder ENCF operatively associated with the movement of the focus adjusting lens LNS in the direction of the optic axis.

Thus, a value obtained by converting the amount of axial movement of the focus adjusting lens into the output pulse number of the encoder by the defocus amount DL to be focus-adjusted, said S and said PTH, i.e., the so-called amount of lens driving FP, is given by the following equation $$FD = DL \times S/PTH$$

Step (203) executes the above equation as it is.

At step (204), FP obtained at the step (203) is delivered to the lens and driving of the focus adjusting lens (in the case of a totally axially moved type single lens, the entire photo-taking lens) is commanded.

At the next step (205), communication is effected with the lens to detect whether the driving by the amount of lens driving FP commanded at the step (204) has been completed, and when the driving is completed, a shift is made to step (206) and the "lens driving" sub-routine is returned to the main program. This detection of the completion of the lens driving is executed by counting the pulse signal of the encoder ENCF by a counter in the control circuit LPRS as described above, and detecting by said communication whether the count value is coincident with said amount of lens driving FP.

The flow of the 637 foreseeing calculation" sub-routine will now be described with reference to FIG. 1A. FIG. 1B shows the flow of the "foreseeing calculation" sub-routine, and this sub-routine discriminates the possibility or impossibility of foreseeing calculation, and if foreseeing is possible, calculates the amount of lens driving taking the AF time-lag and the release time-lag into consideration.

Step (302) discriminates whether a counter COUNT (used for discriminating whether the accumulation of data necessary for foreseeing has been done) should be counted up. In the present embodiment, if three or more measured distance data or lens driving data are accumulated, that is, if COUNT>2, foreseeing calculation is possible and any more count-up is not necessary and therefore, if COUNT>2, an advance is made to step (304). Also, if COUNT<3, the counter COUNT is counted up at step (303), whereafter an advance is made to step (304).

At the step (304), renewal of the data for the current foreseeing calculation is effected. That is, foreseeing calculation is effected on the basis of the equations (6), (7), (8) and (9) and therefore, as said data, there are required the last and before-last defocus amounts $DF_2$ and $DF_1$, the last amount of lens driving $DL_1$, the current amount of lens driving $DL_2$, the before-last and last time intervals $TM_1$ and $TM_2$ and the expected time-lag TL in FIG. 2. Consequently, at the step (304), each time focus detection is effected, the last defocus amount is input to a memory area $DF_2$, the before-last defocus amount is input to a memory area $DF_1$, the last amount of lens driving DL as converted into the amount of movement of the imaging plane is input to a memory area $DL_2$, and the before-last amount of lens driving $DL_1$ as converted into the amount of movement of the imaging plane is input to a memory area $DL_1$, and the data in each memory area is renewed into data necessary for the current foreseeing calculation.

At step (305), whether AFP representing the position of the distance measuring point being used is "0" is discriminated. Here, when AFP is "−1", it shows that the left distance measuring point is being used, and when AFP is "0", it shows that the middle distance measuring point is being used, and when AFP is "1", it shows that the right distance measuring point is being used. That is, at the step (305), whether the middle distance measuring point is being used is discriminated, and if the middle distance measuring point is being used, a shift is made to step (306), and if not so, a shift is made to step (307).

At the step (307), whether the left distance measuring point is being used is discriminated in the same manner as at step (305), and if the left distance measuring point is being used, a shift is made to step (308), and if the right distance measuring point is being used, a shift is made to step (309).

At the steps (306), (308) and (309), the defocus amount measured this time at the distance measuring point used this time is input to a memory area $DF_3$ of the RAM and renewal of data is effected. At the step (306), the defocus amount DFB based on the image signal of the sensor SNSB at the middle distance measuring point is input, and at the step (308), the defocus amount DFA based on the image signal of the sensor SNSA at the left distance measuring point is input, and at the step (309), the defocus amount DFC based on the image signal of the sensor SNSC at the right distance measuring point is input. When these steps are completed, a shift is made to step (310).

At the step (310), whether the data necessary for foreseeing calculation have been input to said various memory areas is discriminated. As described above, foreseeing calculation requires the current, last and before-last defocus amounts and the last, and before-last amounts of lens driving, and is performed on the condition that three or more focus adjusting operations have been performed in the past. Consequently, at step (303), each time the focus adjusting operation is performed, +1 is effected on the counter COUNT and the counter is caused to count the number of times the focus adjusting operation is performed. If the number of times counted is greater than 2, that is, if three or more operations have been performed, and foreseeing calculation is possible, a shift is made to step (312), and if foreseeing calculation is impossible, a shift is made to step (319).

At the step (312), whether the currently renewed defocus amount is suitable for foreseeing, that is appropriate to the "continuity of imaging plane position", is discriminated. If it is judged that there is continuity, a shift is made to step (313), and if not so, a shift is made to step (314). The method of discriminating the "continuity of imaging plane position" will be described later.

If at the step (312), it is judged that there is no continuity of imaging plane position and a shift is made to the step (314), the distance measuring point used in the "distance measuring point changing" sub-routine is changed at this step. The details of this sub-routine will be described later.

At step (315), the distance measuring point is changed and thereafter, whether foreseeing has become possible by ANG is discriminated. If foreseeing is possible, a shift is made to step (313), and if foreseeing is impossible (inappropriate data), a shift is made to step (316).

At the step (316), the counter COUNT for counting the number of times over which the accumulation of data has been performed is reset to discontinue foreseeing calculation once. At step (317), the flag ANG for discriminating the possibility or impossibility of foreseeing is reset.

At step (318), the defocus amount DFB of the middle distance measuring point is input to the amount of lens driving DL as converted into the amount of movement of the imaging plane. If foreseeing once becomes impossible, the distance measuring point used when AF is started again is the middle distance measuring point, whereas this need not be the middle distance measuring point, but use may be made, for example, of the distance measuring point selected at first, or the distance measuring point used last.

Also, in the first and second distance measurements, a shift is made to step (319), where the defocus amount $DF_3$ renewed this time is input to the amount of lens driving DL as converted into the amount of movement of the imaging plane.

Also, if at step (312), it is judged that foreseeing is possible and a shift is made to step (313), calculation of the expected time-lag TL is effected at the step (313). As previously described, the time from the last focus detecting operation until the current focus detecting operation is memorized in the memory area $TM_2$, and under the assumption that the time required for the current focus adjustment is also coincident with $TM_2$, the expected time-lag $TL=TM_2+TR$ is found. Here, TR is the release time-lag.

At the next steps (320) and (321), A and B representing the terms a and b of the equations (6) and (7) are found on the basis of the data stored in the memory areas $DF_1-DF_3$, $DL_1$, $DL_2$, $TM_1$ and $TM_2$, and a shift is made to step (322).

At the step (322), the calculated value of the equation (9) is found on the basis of the data in each memory means and the calculated values of the steps (313), (320) and (321), and the current amount of lens driving DL, as converted into the amount of movement of the imaging, plane is found from it.

At the next step (323), the amount of lens driving DL found at the steps (322), (318) and (319) is compared with the product FN·δ of the full open F-number FN of the photo-taking lens and a predetermined coefficient δ (in the present embodiment, 0.035 mm), and if DL<FN·δ, 1 shift is made to step (324), and if not, a return is made at step (325).

At the step (324), if at the previous step (323), it has been judged that the amount of lens driving DL is smaller than the depth of imaging plane FN·δ, that is, there is no necessity of lens, driving, the amount of lens driving DL is changed to DL=0 and the driving of the lens is inhibited. Thus, unnecessary minute lens driving is no longer effected and both of the sense of use and the power consumption can be improved. Also, in the present embodiment, FN is the full open F-number of the photo-taking lens, but even if this is the photographing aperture value, there is no problem, and δ is not limited to 0.035 mm. When this step is completed, this sub-routine returns to the main program at step (325).

The flow of the "distance measuring point changing" sub-routine will now be described with reference to FIG. 1B. FIG. 1B shows the flow of the "distance measuring point changing" sub-routine, which is a sub-routine for changing the distance measuring point to another distance measuring point capable of foreseeing control because it has been judged that the defocus amount of the distance measuring point selected this time is unsuitable for foreseeing control.

At step (402), whether the distance measuring point used this time is the middle distance measuring point is discriminated by AFP, and if the middle distance measuring point is used, a shift is made to step (403), and if not, a shift is made to step (413).

At the step (413), whether the distance measuring point used this time is the left distance measuring point is discriminated in the same manner as at the step (402), and if the left distance measuring point is used, a shift is made to step (414), and if the right distance measuring point is used, a shift is made to step (425).

Steps (403)-(412), (414)-(423) and (425)-(434) are for selecting the distance measuring point making a change in the imaging plane position approximate to the change in the imaging plane position up to the last time, from the defocus amount of the other distance measuring point than the distance measuring point used this time.

At step (403), the movement velocity V1 of the imaging plane from the before-last distance measurement until the last distance measurement is calculated. At the next step (404), the defocus amount DFA of the left distance measuring point is used to calculate the movement velocity V2 of the imaging plane from the last distance measurement until the current distance measurement.

At step (405), the absolute value VA of the difference between V1 and V2 calculated at the steps (403) and (404) is calculated. This represents the difference between the movement velocity V1 of the imaging plane until now and the movement velocity V2 of the imaging plane at the new left distance measuring point, that is, continuity, and the smaller is the value of VA, the higher is continuity.

At step (406), the defocus amount DFC of the right distance measuring point is used to calculate the movement velocity V3 of the imaging plane from the last distance measurement until the current distance measurement. At step (407), VC representing the continuity when the right distance measuring point is used is calculated in the same manner as in the step (405).

At the next step (408), VA and VC which evaluate the continuity of the change in the imaging plane position are compared, and if VA<VC, that is, if the continuity at the left distance measuring point is higher, a shift is made to step (411), and if not, a shift is made to step (409).

At the step (409), the defocus amount DFC of the right distance measuring point is input to a memory area $DF_3$ on the RAM because the right distance measuring point is higher in continuity. At step (410), "1" representing the right distance measuring point is input to AFP representing the distance measuring point used.

At the step (411), the defocus amount DFA of the left distance measuirng point is input to the memory area $DF_3$ on the RAM because the left distance measuring point is higher in continuity. At step (412), "−1" representing the left distance measuring point is input to AFP.

When the step (410) or (412) is completed, a shift is made to step (435). Also, steps (414)-(423) and (425)-(434) are for selecting the distance measuring point of high continuity approximate to the change in the imaging plane position from the before-last time until the last time, and the operation thereof is similar to that of the steps (403)–(412) and the details thereof need not be described.

At step (435), whether the continuity of the imaging plane position is suitable for foreseeing control is judged from the defocus amount of the changed distance measuirng point, and if it is suitable, a shift is made to step (438), and if it is not suitable, a shift is made to step (436).

At the step (436), "1" is input to the flag ANG for once discontinuing foreseeing control because, in spite of the distance measuring point having been changed to the most suitable point, it has been judged that the point is not suitable for foreseeing control. At step (437), "0" is input to AFP to return the distance measuring point used for the middle distance measuring point. When this step is completed, a shift is made to step (438), and this sub-routine is returned to the main program.

In the above-described foreseeing calculation and distance measuring point changing sub-routines, when the continuity of the image is not found at the step (312) by the defocus data of the distance measuring point used at first, distance measuring point changing is carried out, and the defocus data at one of the three distance measuring points which is highest in continuity is detected, and on the basis of this data, at the step (435), the presence or absence of the continuity is again judged, and if the continuity is found, foreseeing calculation based on the above-mentioned defocus data of the highest continuity continues to be executed at the steps (313)–(322). At this time, the value of AFP indicative of the distance measuring point of said defocus data becomes a value conforming to the distance measuring point of that data, and the focus detection thereafter is effected in conformity with the defocus data from the changed distance measuring point and changing of the distance measuring point is performed. Also at step (435), if the continuity is not found, ANG is changed to ANG=1 and the foreseeing process is discontinued temporarily, and the lens driving by the data of the middle distance measuring point is effected.

Figure 9:
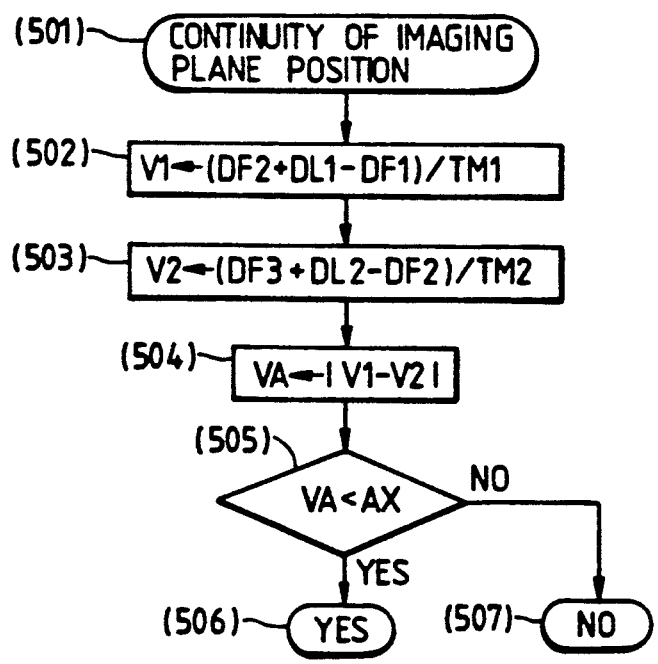
FIG. 9 shows the flow chart of the "judgment of continuity of imaging plane position" sub-routine of FIG. 1.

The "judgment of continuity of imaging plane position" sub-routine will now be described with reference to FIG. 9.

At step (502), calculation $(DF_2+DL_1-DF_1)/TM_1$ is effected on the basis of the data in each memory area. This calculation is a step for calculating the averaged value V1 of the movement velocity of the imaging plane between the times $t_1$ and $t_2$ of FIG. 2. The calculation at the next step (503) is likewise a step for calculating the average value V2 of the movement velocity of the imaging plane between the times $t_2$ and $t_3$. Thereafter, an advance is made to step (504).

At the step (504), the absolute value VA of the difference between the movement velocities V1 and V2 of the imaging plane found at the steps (502) and (503) is calculated, and a shift is made to step (505).

At the step (505), the VA found at the step (504) is compared with a preset number AX, and if VA is greater than AX, it is judged that there is no continuity of the imaging plane position, and if VA is smaller than AX, it is judged that there is continuity of the imaging plane position.

The principle of the judgment as to the presence and absence of the continuity by the above-described flow is based on the fact that if the same object is being pursued, the then movement velocity of the imaging plane changes continuously. So, the movement velocities of the imaging plane adjacent to each other in terms of time are calculated, and if the difference therebetween is small, it is deemed that the movement velocity of the imaging plane is continuously changing, and it is judged that the same object is being distance-measured, and the foreseeing calculation is effected. In contrast, if the change in the movement velocity of the imaging plane is sufficiently great, it is deemed that the movement velocity of the imaging plane is not continuously changing.

Figure 10:
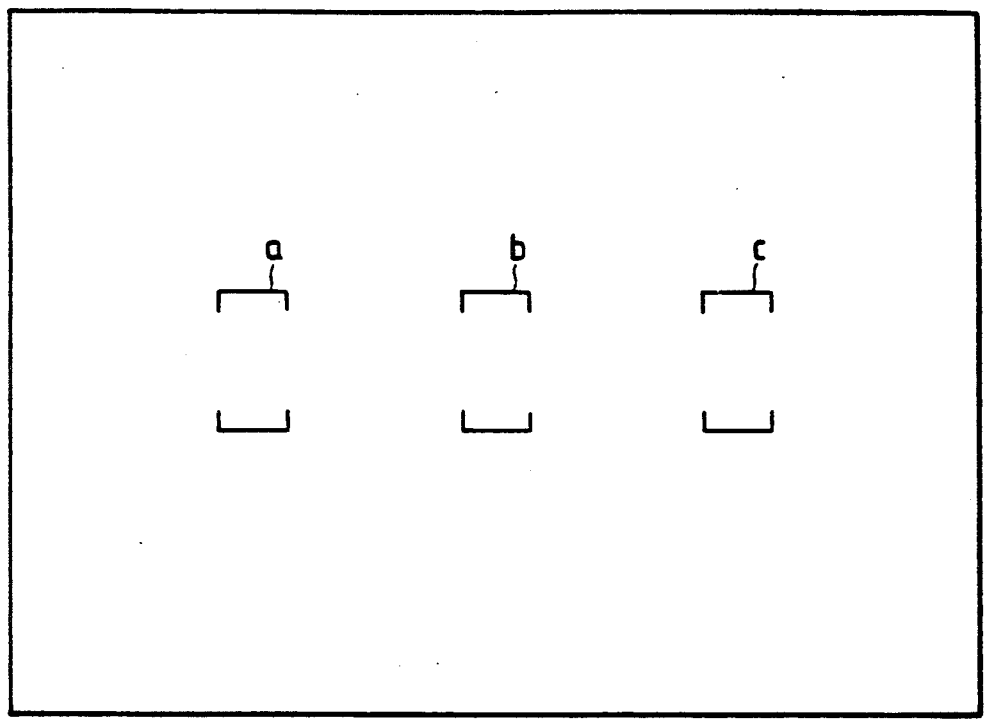
FIG. 10 illustrates the finder of a camera having the focus adjusting device of FIG. 4.

FIG. 10 shows the finder of the camera having three distance measuring points according to the present embodiment, and the distance measuring frames a, b, and c in the figure show three distance measuring areas.

In the present embodiment, one of the three distance measuring points which is suitable for foreseeing control is automatically selected. So, in a camera having a finder display capable of displaying to the photographer what distance measuring point is being used, that distance measuring point is displayed and provided to the photographer, whereby the photographer can confirm whether foreseeing control is being effected for an object matching the photographer's purpose. Also, when two or more distance measuring points are the same measured distance data and one of those distance measuring points is being used, all the distance measuring points of the same measured distance data are displayed, whereby the photographer further becomes able to readily confirm to what range the lens is in focus.

In the above-described embodiment, selection of the distance measuring points has been effected on the basis of the magnitude of the continuity of the imaging plane position. A description will hereinafter be given of an example in which the contrast of the image signal of each distance measuring point is detected and a distance measuring point suitable for foreseeing control is selected from the detected contrast. However, the system and main flow of the entire camera are the same as those of the above-described embodiment and need not be described herein, and only the foreseeing calculation and distance measuring point changing sub-routines will be described.

FIG. 11A shows the flow of the "foreseeing calculation" sub-routine in which the distance measuring point changing by the above-described method is effected.

Step (602) is a sub-routine for calculating the contrast of the image signal of each distance measuring point, and the method of detecting the contrast is already known and in the present embodiment, it need not be described in detail.

Step (603) judges whether the counter COUNT for discriminating whether the accumulation of the data necessary for foreseeing has been completed should be counted up. In the present embodiment, if three or more measured distance data and lens driving data are accumulated, that is, if COUNT>2, foreseeing calculation is possible and any further count-up is not necessary and therefore, if COUNT>2, an advance is made to step (605). Also, if COUNT<3, at step (604), the counter COUNT is counted up, whereafter an advance is made to the step (605).

At the step (605), renewal of the data for the current foreseeing calculation is effected. That is, foreseeing calculation is effected on the basis of the equations (7), (8) and (9) and therefore, as the data therefore, the last and before-last defocus amounts $DF_2$ and $DF_1$, the last amount of lens driving $DL_1$, the current amount of lens driving $DL_2$, the before-last and last time intervals $TM_1$ and $TM_2$ and the expected time-lag TL in FIG. 2 are required. Consequently, at the step (605), each time focus detection is effected, the last defocus amount and the before-last defocus amount are input to the memory area $DF_2$ and the memory area $DF_1$, respectively, and further, the last amount of lens driving DL as converted into the amount of movement of the imaging plane and the before-last amount of lens driving $DL_1$ as converted into the amount of movement of the imaging plane are input to the memory area $DL_2$ and the memory area $DL_1$, respectively, and the data in each memory area is renewed into the data necessary for the current foreseeing calculation.

At step (606), whether AFP representing the position of the distance measuring point being used is "0" is discriminated. If AFP is "−1", it shows that the left distance measuring point is being used, and if AFP is "0", it shows that the middle distance measuring point is being used, and if AFP is "1", it shows that the right distance measuring point is being used. That is, at the step (606), whether the middle distance measuring point is being used is discriminated, and if the middle distance measuring point is being used, a shift is made to step (608), and if not, a shift is made to step (607).

At the step (607), whether the left distance measuring point is being used is discriminated in the same manner as in the step (606), and if the left distance measuring point is being used, a shift is made to step (609), and if the right distance measuring point is being used, a shift is made to step (610).

At the steps (608), (609) and (610), the defocus amount measured at the distance measuring point used this time is input to the memory area $DF_3$ of the RAM and renewal of the data is effected. At the step (608), the defocus amount DFB of the central distance measuring point is input, and at the step (609), the defocus amount DFA of the left distance measuring point is input, and at the step (610), the defocus amount DFC of the right distance measuring point is input. When these steps are completed, a shift is made to step (611).

At the step (611), whether the data necessary for foreseeing calculation are input to each said memory area is discriminated. As described above, foreseeing calculation requires the current, last, and before-last defocus amounts and the last and before-last amounts of lens driving, and is performed on the condition that three or more focus adjusting operations have been performed in the past. Consequently, at the step (604), each time the focus adjusting operation is performed, the counter is caused to count the number of times over which the focus adjusting operation has been performed, and whether the number of times is greater than 2, that is, whether three or more operations have been performed, is discriminated, and if three or more operations have been performed and foreseeing calculation is possible, a shift is made to step (612), and if foreseeing calculation is impossible, a shift is made to step (618).

At the step (612), whether the contrast of the image signal of the distance measuring point used for foreseeing is sufficient to effect focus detection is discriminated, and if the contrast is sufficient, a shift is made to step (619), and if the contrast is insufficient, i.e., low contrast, a shift is made to step (613).

At the step (613), distance measurement cannot be performed at the distance measuring point used this time and therefore, a distance measuring point at which distance measurement is possible is selected. This "distance measuring point changing" sub-routine will be described later.

At step (614), the distance measuring point is changed, whereafter whether foreseeing has become possible by ANG is discriminated, and if foreseeing is possible, a shift is made to step (619), and if foreseeing is impossible, that is, if the image signal is of low contrast (inappropriate data) even after the distance measuring point has been changed, a shift is made to step (615).

At the step (615), the counter COUNT for counting the number of times over which the accumulation of data has been performed is reset to discontinue foreseeing control once. At step (616), the flag ANG for discriminating the possibility or impossibility of foreseeing is reset.

At step (617), the defocus amount DFB of the middle distance measuring point is input to the amount of lens driving DL as converted into the amount of movement of the imaging plane. This is such that if foreseeing becomes impossible once, the distance measuring point to be used when AF is again started is the middle distance measuring point, and this need not be the middle distance measuring point, but use may be made, for example, of the distance measuring point selected at first, or the distance measuring point used last.

At step (618), the defocus amount $DF_3$ renewed this time is input to the amount of lens driving DL as converted into the amount of movement of the imaging plane.

When the step (617) or (618) is completed, a shift is made to step (628).

At steps (619) and (620), discrimination of the distance measuring point used this time is effected by AFP in the same manner as at the steps (606) and (607). If the middle distance measuring point is selected, a shift is made to step (621), and if the left distance measuring point is selected, a shift is made to step (622), and if the right distance measuring point is selected, a shift is made to step (623).

At the step (621), the contrast value CNTB of the middle distance measuring point used this time is input to the memory area CNT of the RAM storing therein the contrast value of the distance measuring point used in the last distance measurement.

At the step (622) or (623), as at the step (621), the contrast value CNTA or CNTC of the left or right distance measuring point is input. When the step (621) or the steps (622) and (623) are completed, a shift is made to step (624). The contrast value of the distance measuring point used this time is stored as the next data in CNT.

Also, if at the steps (612) and (614), it is judged that foreseeing is possible and shift is made to the step (619), calculation of the expected time-lag TL is effected at the step (624). As previously described, the time from the last focus detecting operation till the current focus detecting operation is memorized in the memory area $TM_2$, and under the assumption that the time required for the current focus adjustment is coincident with $TM_2$, the time-lag $TL=TM_2TR$ is found.

At the next steps (625) and (626), A and B representing the terms a and b of the equations (6) and (7) are found on the basis of the data stored in the memory areas $DF_1$–$DF_3$, $DL_1$, $DL_2$, $TM_1$ and $TM_2$, and a shift is made to step (627).

At the step (627), the operation value of the equation (9) is found on the basis of the data in each memory means and the operation values of the step (624) and the steps (625) and (626), and this is defined as the current amount of lens driving DL as converted into the amount of movement of the imaging plane.

At the next step (628), the amount of lens driving DL found at the steps (627), (617) and (618) is compared with the product FN·δ of the full open F-number FN of the photo-taking lens and a predetermined coefficient δ (in the present embodiment, 0.035 mm), and if $DL<FN\cdot\delta$, a shift is made to step (629), and if not, a return is made at step (630).

The flow of the "distance measuring point changing" sub-routine used in FIG. 11A will now be described with reference to FIG. 11B. FIG. 11B shows the flow of the "distance measuring point changing" sub-routine, and this is a sub-routine for changing the distance measuring point to another distance measuring point capable of focus detection because the contrast of the distance measuring point selected this time is low and it is judged that focus detection is impossible.

At step (702), whether the distance measuring point used this time is the middle distance measuring point is discriminated by AFP, and if the middle distance measuring point is used, a shift is made to step (704), and if not, a shift is made to step (703).

At the step (703), whether the distance measuring point used this time is the left distance measuring point is discriminated in the same manner as in the step (702), and if the left distance measuring point is used, a shift is made to step (717), and if the right distance measuring point is used, a shift is made to step (730).

Steps (704)–(716), (717)–(729) and (730)–(742) compare the current contrast of the other distance measuring (other point than the distance measuring point used this time) with the last contrast CNT of the distance measuring point used at the last time, and select a distance measuring point of contrast approximate to CNT. This is such that if the object is the same object, the contrast of the image signal thereof is considered to be approximate and whether the object is the same object is discriminated by the contrast in foreseeing control and a distance measuring point is selected.

At the step (704), the difference CN1 between the contrast value CNTA of the left distance measuring point used this time and the contrast value CNT of the distance measuring point used at the last time is calculated. The contrast value used at the last time is stored in CNT at the steps (621)–(623). At step (705), as at the step (704), the difference CN2 between the contrast CNTC of the right distance measuring point used this time and the contrast CNT of the distance measuring point used at the last time is calculated.

At the next step (706), the absolute values of CN1 and CN2 are compared with each other, and if $|CN1|<|CN2|$, a shift is made to step (709), and if not so, a shift is made to step (707). CN1 and CN2 are the difference between the contrast of each distance measuring point at which distance measurement has been effected this time and the contrast CNT of the image signal used at the last time, and it is judged that the smaller are the absolute values of these values, the more approximate to the image signal used at the last time, that is, the same object is being distance-measured. Therefore, if the same object as the last time enters the left distance measuring point, a shift is made to step (709), and if the same object as the last time enters the right distance measuring point, a shift is made to step (707).

At the step (707), the defocus amount DFC of the right distance measuring point is input to the memory area DF3 of the RAM storing therein the current defocus amount used for foreseeing calculation. At the next step (708), "1" representing the use of the right distance measuring point is input to AFP, and a shift is made to step (711).

At step (709), as at the step (707), the defocus amount DFA of the left distance measuring point is input to DF3. At the next step (710), "−1" representing the use of the left distance measuring point is input to AFP, and a shift is made to step (711).

At the step (711), whether the contrast of the changed distance measuring point is sufficient to effect focus detection is discriminated. If it is sufficient, a shift is made to step (743), and if not, a shift is made to step (712), where the distance measuring point is changed.

At the step (712), whether the changed distance measuring point is the left distance measuring point is discriminated, and if it is the left distance measuring point, a shift is made to step (715), and if it is the right distance measuring point, a shift is made to step (713).

At the step (713), "−1" is input to AFP to change the distance measuring point to the left. At step (714), the defocus amount DFA of the left distance measuring point is input to DF3.

At the step (715), "1" is input to AFP to change the distance measuring point to the right. At step (716), the defocus amount DFC of the right distance measuring point is input to DF3.

When the step (714) or (716) is completed, a shift is made to step (743).

At steps (717)–(729) and (730)–(742), the distance measuring point is changed in the same manner as at the steps (704)–(716), but the description thereof is omitted herein.

At step (743), whether the contrast of the finally selected distance measuring point is sufficient to effect focus detection is discriminated, and if it is sufficient, a shift is made to step (746), and if it is insufficient, i.e., low contrast, a shift is made to step (744).

At the step (744), "1" is input to the flag ANG indicative of the impossibility of focus detection, and it is detected that focus detection is impossible. At step (745), "0" is input to AFP to return the distance measuring point to the middle, and this sub-routine at the step (746) is returned to the main program.

By the above-described operation, when the contrast data of the distance measuring point used this time is low, at steps (704)–(710), a distance measuring point at which the probability of the identity of the image is high is found from the contrast data at another distance measuring point. If the contrast at this distance measuring point is high, foreseeing calculation is effected on the basis of the defocus signal at the distance measuring point exhibiting this contrast, whereafter foreseeing-calculated lens driving is effected on the basis of the data at the distance measuring point after being changed. Also, when the contrast at the distance measuring point changed at the steps (704)–(710) is low, the distance measuring point is further changed, and when the contrast at this re-changed distance measuring point is high, said foreseeing calculation is continued on the basis of the data at this re-changed distance measuring point. When the contrast at the re-changed distance measuring point is also low, said foreseeing calculation is temporarily discontinued and the lens driving of the ordinary servo AF by the data at the middle distance measuring point is effected.

FIG. 11C shows the flow of the "low contrast discrimination" sub-routine for discriminating whether the contrast of the image signal in FIGS. 11A and 11B is at a level capable of focus detection, i.e., low contrast.

At step (802), a flag CNN for discriminating whether the contrast of the distance measuring point used is low contrast is reset.

At step (803), whether the distance measuring point used is the middle one is discriminated by AFP, and if the middle distance measuring point is used, a shift is made to step (805), and if not, a shift is made to step (804).

At the step (804), whether the distance measuring point used is the right distance measuring point is discriminated by AFP, and if the left distance measuring point is used, a shift is made to step (807), and if the right distance measuring point is used, a shift is made to step (809).

At the step (805), the contrast CNTB of the middle distance measuring point is compared with a predetermined number BX, and if CNTB>BX, a shift is made to step (811), and if not, a shift is made to step (806). BX is the lower limit value of the contrast capable of focus detection, and if the contrast is higher than this value, focus detection of sufficient accuracy is possible.

If at the step (805), it is judged that the contrast of the middle distance measuring point is low contrast and shift is made to the step (806), at the step (806), "1" is input to the flag CNN indicative of the low contrast state, and a shift is made to step (811).

At steps (807), (808) and (809), (810), as at the steps (805) and (806), whether the contrast of the left distance measuring point and the right distance measuring point is low contrast is discriminated, and if it is low contrast, "1" is input to the flag CNN and a shift is made to step (811).

At the step (811), whether the contrast is low is discriminated by the flag CNN, and if the contrast is low, a shift is made to step (813), and if not, shift is made to step (812), and this sub-routine is returned to the main program.

FIGS. 12A–12C are for illustrating another embodiment of the foreseeing calculation and the distance measuring point changing sub-routine. FIG. 12A shows the flow of the "foreseeing calculation" sub-routine, FIG. 12B shows the flow of the "distance measuring point changing" sub-routine, and FIG. 12C shows the flow of the "low illuminance discrimination" sub-routine.

The gist of this embodiment is that when the impossibility of distance measurement is judged by the discrimination of the illuminance of the object or an object of low illuminance inappropriate for foreseeing is distance-measured, the distance measuring point is changed. The present embodiment is designed such that a distance measuring point at which there is an object having an illuminance approximate to the object illuminance of the last distance measuring point is selected. The method of measuring and discriminating the illuminance uses the accumulation times TEA, TEB and TEC of the line sensors at the respective distance measuring points, and the shorter the accumulation time, the higher the illuminance, and if the values of TEA, TEB and TEC are great, the object is an object of low illuminance.

The flows of FIGS. 12A–12C differ from the previous embodiment in that the accumulation time data is used instead of the contrast data to effect processing, and are processed by substantially the same flow as the discrimination of FIG. 11 by the contrast and therefore need not be described in detail.

As another example of foreseeing calculation, a description will now be given of a foreseeing calculation sub-routine in which a change in the imaging plane position of the object at each distance measuring point is detected and a distance measuring point at which the change in the imaging plane position is great is selected. This sub-routine is for causing the foreseeing control itself to follow a fast moving object, and is a sub-routine in which the selection of this foreseeing mode by the photographer has been performed on the premise that the main object is a fast moving object. That is, it is a sub-routine based on the idea that a distance measuring point at which the change in the imaging plane position is great catches the correct object. FIGS. 13A and 13B illustrate said sub-routine, and the main flow thereof and the system of the entire camera are a common flow as in the afore-described embodiments and therefore need not be described herein.

In FIG. 13A, step (1202) discriminates whether the counter COUNT for discriminating whether the accumulation of the data necessary for foreseeing has been performed should be counted up. In the present embodiment, if three or more measured distance data and lens driving data are accumulated, that is, if COUNT>2, foreseeing calculation is possible and any further count-up is not necessary and therefore, if COUNT>2, advance is made to step (1204). If COUNT<3, the counter COUNT is counted up at step (1203), whereafter an advance is made to step (1204).

At steps (1204) and (1205), renewal of the data for the current foreseeing calculation is effected.

That is, foreseeing calculation is effected on the basis of the equations (6), (7), (8) and (9) and therefore, as the data therefor, the current defocus amount $DF_3$, the last and before-last defocus amounts $DF_2$ and $DF_1$, the last amount of lens driving $DL_1$, the current amount of lens driving $DL_2$, the before-last and last time intervals $TM_1$ and $TM_2$ and the expected time-lag TL in FIG. 2 are required. So, at the step (1204), each time the focus detecting operation is performed, the last amount of lens driving DL (as converted into the amount of movement of the imaging plane) is input to the memory area $DL_2$ on the RAM, and the before-last amount of lens driving $DL_2$ (as converted into the amount of movement of the imaging plane) is input to the memory area $DL_1$. At the step (1205), the defocus amounts DFA, DFB and DFC detected this time at the respective distance measuring points are input to memory areas DFA3, DFB3 and DFC3, respectively, the defocus amounts detected at the last time are input to DFA2, DFB2 and DFC2, respectively, and the defocus amounts detected at the before-last time are input to DFA1, DFB1 and DFC1, respectively, and they are renewed into data necessary for the current foreseeing calculation.

At step (1206), whether the data necessary for foreseeing calculation are input to the above-mentioned memory areas is discriminated. As described above, foreseeing calculation requires the current, last and before-last defocus amounts and the last and before-last amounts of lens driving, and is performed on the condition that the focus adjusting operation has been performed three or more times in the past. Consequently, at step (1203), each time the focus adjusting operation is performed, +1 is effected on the counter COUNT, and the counter is caused to count the number of times over which the focus adjusting operation has been performed, and whether that number of times is greater than 2, that is, whether three or more operations have been performed, is discriminated. If three or more operations have been performed and foreseeing calculation is possible, a shift is made to step (1207), and if foreseeing calculation is impossible, a shift is made to step (1209).

The step (1207) is the "distance measuring point selection" sub-routine in which foreseeing control is effected and distance measuring point selection is effected, and the details thereof will be described later.

At step (1208), whether the counter for counting the number of accumulated data is reset is discriminated, and if the counter is reset, a shift is made to step (1209), and if not so, a shift is made to step (1219). That is because when in the "distance measuring point selection" sub-routine of the step (1207), it has been judged that the previous distance measuring point is unsuitable for foreseeing control, the counter COUNT is reset and foreseeing calculation is not effected.

At the step (1209), whether the accumulation of the data necessary for foreseeing has been effected twice is discriminated, and if the accumulation of the data has been effected twice, a shift is made to step (1210), and if not, a shift is made to step (1218), and the defocus amount DF of the middle distance measuring point is input to the amount of lens driving DL.

Steps (1210)-(1218) are for detecting from two measured distance data the distance measuring point at which the change in the imaging plane position is greatest, and at the step (1210), the movement velocity VA2 of the imaging plane at the left distance measuring point is calculated, and at the next step (1211), the movement velocity VB2 of the imaging plane at the middle distance measuring point is calculated, and at the step (1212), the movement velocity VC2 of the imaging plane at the right distance measuring point is calculated.

At the step (1213), the movement velocity VA2 of the imaging plane at the left distance measuring point is compared with the movement velocity VB2 of the imaging plane at the middle distance measuring point, and if $|VA_2| > |VB_2|$, a shift is made to the step (1215), and if not, a shift is made to the step (1214). At the step (1215), the movement velocity of the imaging plane at the left distance measuring point is compared with the movement velocity of the imaging plane at the right distance measuring point, and if $|VA_2| > |VC_2|$, a shift is made to the step (1216), and if not, a shift is made to the step (1217).

At the step (1214), the movement velocity of the imaging plane at the middle distance measuring point is compared with the movement velocity of the imaging plane at the right distance measuring point, and if $|VB_2| > |VC_2|$, a shift is made to the step (1218), and if not, a shift is made to the step (1217).

If by the steps (1210)-(1215), the movement velocity $VA_2$ of the imaging plane at the left distance measuring point is greatest, a shift is made to the step (1216), and if the movement velocity $VB_2$ of the imaging plane at the middle distance measuring point is greatest, a shift is made to the step (1218), and if the movement velocity VC2 of the imaging plane at the right distance measuring point is greatest, a shift is made to the step (1217).

At the steps (1216), (1217) and (1218), the defocus amount of the distance measuring point at which the movement velocity of the imaging plane is greatest is input to the amount of lens driving DL and a shift is made to step (1223).

If at the step (1208), it has been judged that foreseeing is possible and a shift has been made to step (1219), the expected time-lag TL is calculated at the step (1219). As previously described, the time from the last focus detecting operation to the current focus detecting operation is memorized in the memory area $TM_2$, and under the assumption that the time required for the current focus adjustment is coincident with $TM_2$, the time-lag $TL = TM_2 + TR$ is found.

At the next steps (1220) and (1221), A and B representing the terms a and b of the equations (6) and (7) are found on the basis of the data stored in the memory areas $DF_1 - DF_3$, $DL_1$, $DL_2$, $TM_1$ and $TM_2$, and a shift is made to step (1222).

At the step (1222), the operation value of the equation (9) is found on the basis of the data in each memory means and the operation values of the step (1219) and the steps (1220) and (1221), and from this, the current amount of lens driving DL, as converted into the amount of movement of the imaging plane, is found.

At the next step (1223), the amount of lens driving DL found at the steps (1222), (1216), (1217) and (1218) is compared with the product $FN \cdot \delta$ of the full open F-number FN of the photo-taking lens and a predetermined coefficient $\delta$ (in the present embodiment, 0.035 mm), and if $DL < FN \cdot \delta$, a shift is made to step (1224), and if not, a return to the main program is carried out at step (1225).

FIG. 13B shows the flow of the "distance measuring point selection" sub-routine of FIG. 13A, and in this sub-routine, a distance measuring point at which the amount of movement of the imaging plane is great and which is suitable for foreseeing is detected.

At step (1302), the movement velocity VA1 of the imaging plane from the before-last distance measurement until the last distance measurement at the left distance measuring point, and the movement velocity VA2 of the imaging plane from the last distance measurement until the current distance measurement are calculated, and a shift is made to the next step (1303).

At the step (1303), the amount of variation VDA in the movement velocity of the imaging plane at the left distance measuring point is calculated on the basis of the result of the calculation at the step (1302), and a shift is made to step (1304).

At the step (1304), as at the step (1302), the movement velocities VB1 and VB2 at the middle distance measuring point are calculated, and on the basis of these values, the amount of variation VDB in the movement velocity of the imaging plane at the middle distance measuring point is calculated at step (1305).

At step (1306), the movement velocities VC1 and VC2 of the imaging plane at the right distance measuring point are calculated in the same manner as at the step (1302). On the basis of these values, the amount of variation VDC in the movement velocity of the imaging plane at the right distance measuring point is calculated at step (1307).

At step (1308), the amount of variation VDA in the movement velocity of the imaging plane at the left distance measuring point found at the step (1303) is compared with a predetermined number AX, and if $VDA < AX$, a shift is made to step (1310), and if not, a shift is made to step (1309). If the same object is being distance-measured, the movement velocity of the imaging plane varies continuously. So, if the amount of variation in the movement velocity of the imaging plane is less than AX, it is judged that the movement velocity of the imaging plane is varying continuously, that is, the same object is being distance-measured, and if not, it is judged that another object has been distance-measured.

If at the step (1308), it is judged that another object has been distance-measured, at the step (1309), "−1" is input to VA2 so that the data of the left distance measuring point may not be used for foreseeing. When this step is completed, a shift is made to the step (1310).

At steps (1310), (1311) and (1312), (1313), whether the data of the middle distance measuring point and the right distance measuring point can be used for foreseeing control is discriminated in the same manner as at the steps (1308) and (1309), and a detailed description thereof is omitted.

At the next step (1314), the movement velocity VA2 of the imaging plane at the left distance measuring point is compared with the movement velocity VB2 of the imaging plane at the middle distance measuring point, and if $|VA2|>|VB2|$, a shift is made to step (1315), and if not, a shift is made to step (1316).

At the step (1315), the movement velocities VA2 and VC2 of the imaging plane at the left and right distance measuring points, respectively, are compared with each other, and if $|VA2|>|VC2|$, a shift is made to step (1317), and if not, a shift is made to step (1321). At step (1316), VB2 and VC2 are compared with each other, and if $|VB2|>|VC2|$, a shift is made to step (1324), and if not, a shift is made to step (1321).

By the steps (1314)–(1316), a distance measuring point which is suitable for foreseeing control and at which the movement velocity of the imaging plane is greatest is selected, and if that distance measuring point is the left distance measuring point, a shift is made to the step (1317), and if that distance measuring point is the middle distance measuring point, a shift is made to the step (1321), and if that distance measuring point is the right distance measuring point, a shift is made to the step (1324).

At the step (1317), whether the selected left distance measuring point is suitable for foreseeing is discriminated, and if $VA2=-1$, it means that at step (1308), it has been judged that the left distance measuring point is unsuitable for foreseeing and therefore, at step (1318), the counter is reset and a shift is made to step (1328). If not, a shift is made to step (1319).

At the step (1319), "−1" is input to AFP representing the distance measuring point used so that the use of the left distance measuring point may be indicated, and a shift is made to step (1320). At the step (1320), the data $DF_1$, $DF_2$ and $DF_3$ used for foreseeing are renewed into the data of the left distance measuring point.

At steps (1321)–(1325) and (1325)–(1327), renewal of the data of the middle or right distance measuring point is effected in the same manner as at the steps (1317)–(1320), and a shift is made to step (1328) and this sub-routine is then returned to the main program The flow of the steps (1321)–(1325) and (1325)–(1327) is the same as that of the steps (1317)–(1320), and need not be described in detail.

In the manner described above, in this embodiment, it becomes possible to detect a moving object and effect foreseeing control for that object.

In the above-described embodiment of FIG. 13, in the first focus detecting operation, the lens is driven by the defocus amount from the middle distance measuring portion. In the second lens driving, the lens is driven on the basis of the defocus amount from the distance measuring portion which is distance-measuring an image moving at the highest speed, and from the third time on, the previously described foreseeing driving is effected. During the foreseeing driving, the above-described foreseeing calculation driving process is carried out on the basis of the past and current data detected by the distance measuring portion which is distance-measuring the image moving at the highest speed. In that case, if the movement speeds of the image at the before-last time and the last time deviate greatly from each other, the foreseeing driving is temporarily inhibited and the foreseeing driving based on the data for an object differing from the object up to now is inhibited.

In the above-described embodiments, selection of the distance measuring points has been effected by means of discrete discrimination standards, but it is apparent that even if these discrimination means are compounded and utilized, the present invention will be effective.

Also, in the above-described embodiments, once the distance measuring point has been changed, that distance measuring point is not changed until the foreseeing control at that distance measuring point becomes impossible. However, when the distance measuring point to be used at first has been selected by the photographer or when it is desired to use chiefly the middle distance measuring point, if foreseeing control is possible by the distance measuring point selected by the photographer or the middle distance measuring point, a return may be made to that distance measuring point.

We claim:

1. An auto focusing device provided with a plurality of light receiving portions for receiving light flux from a plurality of different positions of a scene, a focus detecting circuit for repetitively detecting the focusing state on the basis of the light reception outputs of said light receiving portions, and a lens driving device for driving a lens in conformity with the focusing state detected by said focus detecting circuit, comprising:

(a) a foreseeing calculation circuit for finding data concerned with lens driving for focusing the lens on an object after a predetermined time on the basis of data concerning a past focus adjusting operation data and data conforming to the focusing state obtained by a new focus detection, said lens driving device for driving the lens in conformity with the foreseeing-calculated data; and (b) a selection circuit for selecting one of the outputs of said plurality of light receiving portions on the basis of the past data conforming to said focusing state, the selected data being used for said foreseeing calculation.

2. An auto focusing device according to claim 1, wherein said selection circuit selects the output of one of said light receiving portions for an object suitable for foreseeing-calculating the data conforming to said focusing state.

3. An auto focusing device according to claim 2, wherein said selection circuit selects the output of one of said light receiving portions which is receiving the light flux form the same object as the object which has been the subject of a past focus adjusting operation.

4. An auto focusing device according to claim 1, wherein said auto focusing device is incorporated in a camera.

5. An auto focusing device according to claim 1, wherein said foreseeing calculation circuit determines the coefficients of a high-order functional equation based on the data concerning said past focus state and a new focus detection operation, and calculates data connected with said lens driving based on the high-order functional equation the coefificents of which are thus obtained.

6. An auto focusing device according to claim 5, wherein said high-order functional equation is represented by $at^2+bt+c$ where a, b, and c are the coeficients.

7. An auto focusing device provided with a focus detecting circuit for detecting the focusing states to objects at a plurality of different positions of a scene and outputting data conforming to said focusing states, and a lens driving device for driving a lens in conformity with the data from said focus detecting circuit, comprising:
(a) a foreseeing calculation circuit for finding data concerned with lens driving for focusing the lens on an object after a predetermined time on the basis of data concerning a past focus state data and data conforming to the focusing state obtained by a new focus detection, said lens driving device driving the lens in conformity with said foreseeing-calculated data; and
(b) a selection circuit for selecting the data conforming to said focusing state on the basis of the past data from among the data conforming to said focusing states found for said different positions, respectively, the selected data being used for said foreseeing calculation.

8. An auto focusing device according to claim 7, wherein said selection circuit selects data conforming to the focusing state at one of the different positions which is distance measuring an object suitable for effecting said foreseeing calculation.

9. An auto focusing device according to claim 8, wherein said selection circuit selects data conforming to the focusing state detected at one of the different positions which is distance-measuring the same object as the object which has been the subject of the past focus adjusting operation.

10. An auto focusing device according to claim 9, wherein said selection circuit judges the similarity between the characteristic of the object represented by said past focus state data and the characteristic of each object represented by the data at each of the different positions, on the basis of said past focus state data and the data conforming to the focusing states at said different positions, and selects data of high similarity.

11. An auto focusing device according to claim 10, wherein the characteristic of said object is a characteristic regarding the movement speed of the object.

12. An auto focusing device according to claim 10, wherein the characteristic of said object is a characteristic regarding the contrast of illuminance of the object.

13. An auto focusing device according to claim 7, wherein said auto focusing device is incorporated in a camera.

14. An auto focusing device according to claim 7, wherein said foreseeing calculation circuit determines the coefficients of a high-order functional equation based on the data concerning said past focus state and a new focus detection operation, and calculates data connected with said lens driving based on the high-order functional equation the coefificents of which are thus obtained.

15. An auto focusing device according to claim 14, wherein said high-order functional equation is represented by $at^2+bt+c$ wherein a, b, and c are coefficients.

16. An auto focusing device provided with a focus detecting circuit for detecting the focusing states of objects at a plurality of different positions of a scene and outputting data conforming to said focusing states, and a lens driving device for driving a lens in conformity with the data from said focus detecting circuit, comprising:
(a) a foreseeing calculation circuit for finding data concerned with lens driving for focusing the lens on an object after a predetermined time on the basis of data concerning a past focus and
(b) a selection circuit for selecting the data conforming to the focusing state in conformity with the past data conforming to said focus state, the selected data being used for the foreseeing calculation.

17. An auto focusing device according to claim 16, wherein said auto focusing device is incorporated in a camera.

18. An auto focusing device according to claim 16, wherein said foreseeing calculation circuit determines the coefficients of a high-order functional equation based on the data concerning said past focus state and a new focus detection operation, and calculates data connected with said lens driving based on the high-order functional equation the coefificents of which are thus obtained.

19. An auto focusing device according to claim 16, wherein said high-order functional equation is represented by $at^2+bt+c$ where a, b, and c are the coefficients.

20. An auto focusing device provided with a plurality of light receiving portions for receiving light fluxes at a plurality of different positions a focus detecting circuit for repetitively detecting the focus state on the basis of the light reception outputs of said light receiving portions, and a lens driving device for driving a lens in conformity with the focus state detected by said focus detecting circuit, comprising:
(a) a foreseeing calculation circuit for finding data concerning lens driving for focusing the lens on an object after a predetermined time on the basis of the past focus state data and data conforming to the focusing state obtained by a new focus detection, said lens driving device driving the lens in conformity with said foreseeing-calculated data; and
(b) a selection circuit for selecting the data conforming to the focus state, as the data obtained by the new focus detection, used for said foreseeing calculation, said selection circuit selecting data conforming to the focus state based of an output of a predetermined portion in accordance with amount of illuminance, contrast, or travelling speed of the object which are represented by outputs of each said light receiving portion.

21. An auto focusing device according to claim 20, wherein said auto focusing device is incorporated in a camera.

22. An auto focusing device provided with a plurality of light receiving portions for receiving light fluxes at a plurality of different positions, a focus detecting circuit for repetitively detecting the focusing state on the basis of the light reception outputs of said light receiving portions, and a lens driving device for driving a lens in conformity with the focusing state detected by said focus detecting circuit, comprising:

(a) a selection circuit for selecting one of the outputs of said light receiving portions at said different positions, causing the focusing state detection result based on said selected output to be output from said focus detecting circuit, and causing said lens driving device to drive the lens on the basis of said focusing state detection result, said selection circuit selecting an output having a similar characteristic to the characteristic of the object represented by a light reception output used in the past lens driving operation among each said light reception outputs, said characteristic concerning contrast, amount of illumination, or travelling speed of the object.

23. An auto focusing device according to claim 22, wherein said auto focusing device is incorporated in a camera.

24. An auto focusing device provided with a plurality of light receiving portions for receiving light fluxes at a plurality of different positions of a scene, a focus detecting circuit for repetitively detecting the focusing state on the basis of the light reception outputs of said light receiving portions, and a lens driving device for driving a lens in conformity with the focusing state detected by said focus detecting circuit, comprising:
(a) a selection circuit for selecting a predetermined one of the light reception outputs at said different positions, causing the focusing state detection result based on said selected output to be output from said focus detecting circuit, and causing said lens driving device to drive the lens on the basis of said focusing state detection result; and
(b) said selection circuit selecting one of said light receiving outputs based on a travelling speed of the object at each position, which is represented by the output of said each light receiving portion.

25. An auto focusing device according to claim 24, wherein said selection circuit selects an output representing a travelling speed close to the travelling speed of the object represented by the output selected by said selection circuit at a preceding operation.

26. An auto focusing device provided with a plurality of light receiving portions for receiving light fluxes at a plurality of different positions of a scene, a focus detecting circuit for repetitively detecting the focusing state on the basis of the light reception outputs of said light receiving portions, and a lens driving device for driving a lens in conformity with the focusing state detected by said focus detecting circuit, comprising:
(a) a selection circuit for selecting a predetermined one of the light reception outputs at said different positions, causing the focusing state detection result based on said selected output to be output from said focus detecting circuit, and causing said lens driving device to drive the lens on the basis of said focusing state detection result; and
(b) said selection circuit selecting the light reception output of one of the different positions which is measuring an object whose image at an imaging plane moves at the highest speed.

27. An auto focusing device according to claim 26, wherein said auto focusing device is incorporated in a camera.

28. An auto focusing device provided with a plurality of light receiving portions for receiving light fluxes from a plurality of different positions of a scene, a focus detecting circuit for repetitively detecting the focusing state on the basis of the light reception output of said light receiving portions, and a lens driving device for driving a lens in conformity with the focusing state detected by said focus detecting circuit, comprising:
(a) a foreseeing calculation circuit for determining lens driving data to make an object, after a predetermined period of time has passe, in-focus on the basis of focus adjusting operation data obtained in the past and focus adjusting operation data conforming to the focusing state obtained in a new focus detection operation; and
(b) a selection circuit for selecting one of the outputs of said plurality of light receiving portions, said selecting circuit selecting an output having a characteristic suitable for the foreseeing calculation on the basis of characteristics of outputs of each portion, said foreseeing calculation circuit determining said lens driving data by using, as said focus adjusting operation data, a focusing state obtained by said detecting circuit corresponding to the output selected by said selection circuit, said lens driving device driving a lens in accordance with said lens driving data thus determined.

29. An auto focusing device according to claim 28, wherein said selection circuit selects the output of one of said light receiving portions which is receiving the light flux from the same object as the object which has been the subject of the past focus adjusting operation.

30. An auto focusing device according to claim 29, wherein the lens driving by said lens driving device based on the data determined by said foreseeing calculation circuit is prohibited when the selection circuit cannot select the light receiving portion which receives light flux from the same object.

31. An auto focusing device according to claim 28, wherein said selection circuit judges the similarity between the characteristic of the object represented by the past focus adjusting operation data and the characteristic of each object represented by the data corresponding to an output at each of a plurality of different positions, and selects a data whose similarity is higher than that of the other.

32. An auto focusing device according to claim 31, wherein the lens driving by said lens driving device based on the data determined by said foreseeing calculation circuit is prohibited when said selection circuit is not capable of selecting the data whose similarity is high.

33. An auto focusing device according to claim 28, wherein said selection circuit defines a difference between the travelling speed of the imaging plane of the object represented by the past focus adjusting operation data and the travelling speed of the imaging plane of the object at said each position obtained by considering the outputs of the different positions obtained in a new focus detection operation, and selects the output of a data of a particular position whose said difference is small.

34. An auto focusing device according to claim 33, wherein said selection circuit determines the outputs from the positions whose difference between the travelling speed of the imaging plane of the object at each position and the travelling speed of the imaging plane of the object represented by the past focus detection operation data is smaller than a predetermined amount and selects, among the determined outputs, an output which represents a high travelling speed.

35. An auto focusing device according to claim 33, wherein the lens driving by said lens driving device based on the data determined by said foreseeing calculation circuit is prohibited when said selection circuit is not capable of selecting the position whose said difference of the travelling speed is small.

36. An auto focusing device according to claim 28, wherein said selection circuit defines a difference between the contrast or the illumination state based on the output of a light receiving portion selected in the past and the contrast or the illumination state of each position based on each output of different positions obtained in the new focus detection operation, and selects the contrast or the illumination state whose said difference is smallest.

37. An auto focusing device according to claim 36, wherein the lens driving by said lens driving device based on the data determined by said foreseeing calculation circuit is prohibited when said selection circuit is not capable of selecting the position whose said difference in the contrast or the illumination state is smallest.

38. An auto focusing device according to claim 28, wherein said foreseeing calculation circuit determines coefficients of a high-order functional equation based on said past focus adjusting operation and focus adjusting operation data of a new focus detection operation, and obtains the lens driving data in accordance with the high-order functional equation whose coefficients are thus determined.

39. An auto focusing device according to claim 38, wherein said high-order functional equation is represented by $at^2+bt+c$ where a, b, and c are the coefficients.

40. An auto focusing device according to claim 28, wherein said selection circuit selects the output of one of said light receiving portions for an object suitable for foreseeing calculation.

41. A camera having an auto focusing device provided with a plurality of light receiving portions for receiving light fluxes from a plurality of different positions of a scene, a focus detecting circuit for repetitively detecting the focusing state on the basis of the light reception outputs of said light receiving portions, and a lens driving device for driving a lens in conformity with the focusing state detected by said focus detecting circuit, comprising:
(a) a foreseeing calculation circuit for determining lens driving data to make an object, after a predetermine period of time has passed, in-focus on the basis of focus adjusting operation data obtained in the past and focus adjusting operation data conforming to the focusing state obtained in a new focus detection operation; and
(b) a selection circuit for selecting one of the outputs of said plurality of light receiving portions, said selecting circuit selecting an output having a characteristic suitable for the foreseeing calculation on the basis of characteristics of outputs of each portion, said foreseeing calculation circuit determining said lens driving data by using, as said focus adjusting operation data, a focusing state obtained by said detecting circuit corresponding to the output selected by said selection circuit, said lens driving device driving a lens in accordance with said lens driving data thus determined.

42. An auto focusing device according to claim 41, wherein said selection circuit selects the output of one of said light receiving portions which is receiving the light flux from the same object as the object which has been the subject of the past focus adjusting operation.

43. An auto focusing device according to claim 40, wherein the lens driving by said lens driving device based on the data determined by said foreseeing calculation circuit is prohibited when the selection circuit cannot select the light receiving portion which receives light flux from the same object.

44. An auto focusing device according to claim 41, wherein said selection circuit judges the similarity between the characteristic of the object represented by the past focus adjusting operation data and the characteristic of each object represented by the data corresponding to an output at each of a plurality of different positions, and selects a data whose similarity is higher than that of the other.

45. An auto focusing device according to claim 44, wherein the lens driving by said lens driving device based on the data determined by said foreseeing calculation circuit is prohibited when said selection circuit is not capable of selecting the data whose similarity is high.

46. An auto focusing device according to claim 41, wherein said selection circuit defines a difference between the travelling speed of the imaging plane of the object represented by the past focus adjusting operation data and the travelling speed of the imaging plane of the object at said each position defined by considering the outputs of the different positions obtained in a new focus detection operation, and selects the output of a data of a particular position whose said difference is small.

47. An auto focusing device according to claim 46, wherein said selection circuit determines the outputs from the positions whose difference between the travelling speed of the imaging plane of the object at each position and the travelling speed of the imaging plane of the object represented by the past focus detection operation data is smaller than a predetermined amount and selects, among the determined outputs, an output which represents a high travelling speed.

48. An auto focusing device according to claim 46, wherein the lens driving by said lens driving device based on the data determined by said foreseeing calculation circuit is prohibited when said selection circuit is not capable of selecting the position whose said difference of the travelling speed is small.

49. An auto focusing device according to claim 41, wherein said selection circuit defines a difference between the contrast or the illumination state based on the output of a light receiving portion selected in the past and the contrast or the illumination state of each position based on each output of different positions obtained in the new focus detection operation, and selects the contrast or the illumination state whose said difference is smallest.

50. An auto focusing device according to claim 49, wherein the lens driving by said lens driving device based on the data determined by said foreseeing calculation circuit is prohibited when said selection circuit is not capable of selecting the position whose said difference in the contrast or the illumination state is smallest.

51. An auto focusing device according to claim 41, wherein said foreseeing calculation circuit determines coefficients of a high-order functional equation based on said past focus adjusting operation and focus adjusting operation data of a new focus detection operation, and obtains the lens driving data in accordance with the high-order functional equation whose coefficients are thus determined.

52. An auto focusing device according to claim 51, wherein said high-order functional equation is represented by $at^2+bt+c$ where a, b, and c are the coefficients.

53. An auto focusing device according to claim 41, wherein said selection circuit selects the output of one of said light receiving portions for an object suitable for foreseeing calculation.

54. A camera having an auto focusing device provided with a plurality of light receiving portions for receiving light fluxes from a plurality of different positions of a scene, a focus detecting circuit for repetitively detecting the focusing state on the basis of the light reception outputs of said light receiving portions, and a lens driving device for driving a lens in conformity with the focusing state detected by said focus detecting circuit, comprising:
  (a) a foreseeing calculation circuit for finding data concerned with lens driving for focusing the lens on an object after a predetermined period of time on the basis of data concerning a past focus state and data conforming to the focusing state obtained in a new focus detection, said lens driving device driving the lens in conformity with said foreseeing-calculated data; and
  (b) a selection circuit for selecting one of the outputs of said plurality of light receiving portions on which the past data conforming to said focusing state used for the foreseeing calculation is based, said foreseeing calculation circuit determining said lens driving data by using, as said focus adjusting operation data, a focusing state obtained by said detecting circuit corresponding to the output selected by said selection circuit, said lens driving device driving a lens in accordance with said lens driving data thus determined.

55. An auto focusing device provided with a plurality of light receiving portions for receiving light fluxes from a plurality of different positions of a scene, a focus detecting circuit for repetitively detecting the focusing state on the basis of the light reception outputs of said light receiving portions, and a lens driving device for driving a lens in conformity with the focusing state detected by said focus detecting circuit, comprising:
  (a) a selection circuit for selecting an output from a specific portion among said light receiving portions;
  (b) a foreseeing calculation circuit for predicting a position of the object a predetermined period of time in the future on the basis of the output selected by said selection circuit in a focus detection operation in the past and the output selected by said selection circuit in a new focus detection operation to obtain the lens driving amount to make the object in-focus, said lens driving device driving the lens based on the predicted position data; and
  (c) a control circuit for, when the output from the specific portion selected by said selection circuit in the new focus detection operation is not suitable for the foreseeing calculation, causing said selection circuit to select an output from another portion, and for performing said foreseeing calculation using said selected output as an output in the new focus detection operation, wherein said control circuit determines that the output from the specific portion is not suitable for the foreseeing calculation when it is determined that a characteristic of the object corresponding to the output from the specific portion is different from a characteristic of the object obtained by the output selected by the selection circuit in the past focus detection operation.

56. An auto focusing device according to claim 55, wherein said characteristic of the object is the travelling speed of the imaging plane of the object.

57. An auto focusing device according to claim 55, wherein said characteristic of the object is contrast.

58. An auto focusing device provided with a plurality of light receiving portions for receiving light fluxes from a plurality of different positions of a scene, a focus detecting circuit for repetitively detecting the focusing state on the basis of the light reception outputs of said light receiving portions, and a lens driving device for driving a lens in conformity with the focusing state detected by said focus detecting circuit, comprising:
  (a) a selection circuit for selecting data concerning an output from one portion among said plurality of light receiving portions;
  (b) a foreseeing calculation circuit for predicting a position of the object a predetermined period of time in the future on the basis of the data selected by said selection circuit in a focus detection operation in the past and the data selected by said selection circuit in a new focus detection operation to obtain the lens driving amount to make the object in-focus, said lens driving device driving the lens based on the predicted position data, said selection circuit selecting data suitable for said foreseeing calculation; and
  (c) a control circuit for, when the selection circuit is not capable of determining the data suitable for the foreseeing calculation, inhibiting the lens driving operation on the basis of the predicted position data.

59. An auto focusing device according to claim 58, wherein said selection circuit selects an output from a light receiving portion which receives a light flux form the same object.

* * * * *

UNITED STATES PATENT AND TRADEMARK OFFICE
CERTIFICATE OF CORRECTION

PATENT NO. : 5,140,359
DATED : August 18, 1992
INVENTOR(S) : HIGASHIHARA ET AL.

It is certified that error appears in the above-identified patent and that said Letters Patent is hereby corrected as shown below:

On title page, item [54] and col. 1,

Title should be --AUTO FOCUSING DEVICE MULTI-POINT DISTANCE MEASURING APPARATUS--.

SHEET 7

Figure 6, "CONVERTION" should read --CONVERSION--.

SHEET 15

Figure 12B-1, "MENSURING" should read --MEASURING--.

COLUMN 1

Line 37, "be" should read --defocus amount to be--.
    Line 38, ". detected" should read --detected--.
    Line 53, "From" should read --From the--.

COLUMN 2

Line 1, "that it" (both occurrences) should be deleted.

COLUMN 4

Line 40, "DRAIWNGS" should read --DRAWINGS--.
    Line 44, "the," should read --the--.

UNITED STATES PATENT AND TRADEMARK OFFICE
CERTIFICATE OF CORRECTION

PATENT NO. : 5,140,359

DATED : August 18, 1992

INVENTOR(S) : HIGASHIHARA ET AL.

It is certified that error appears in the above-identified patent and that said Letters Patent is hereby corrected as shown below:

COLUMN 5

Line 26, "having" should read --has--.
    Line 68, "field." should read --image field--.

COLUMN 6

Line 28, "automatic an" should read --an automatic--.
    Line 66, "singal" should read --signal--.
    Line 67, "clocks" should read --clock signals--.

COLUMN 7

Line 38, "terminal'-" should read --terminal",--.
    Line 39, "', of" should read --of--.
    Line 45, "charging" should read --down--.
    Line 46, "down and" should read --and charging--.
    Line 47, "si" should read --is--.
    Line 50, circuit" should read --circuits--.

COLUMN 8

Line 21, "in" should read --with--.
    Line 22, "all" should be deleted.
    Line 39, "camrea." should read --camera.--.

COLUMN 9

Line 57, "communciation." should read --communication.--.

UNITED STATES PATENT AND TRADEMARK OFFICE
CERTIFICATE OF CORRECTION

PATENT NO. : 5,140,359
DATED : August 18, 1992
INVENTOR(S) : HIGASHIHARA ET AL.

It is certified that error appears in the above-identified patent and that said Letters Patent is hereby corrected as shown below:

COLUMN 10

Line 17, "637 image" should --image--.
Line 24, "as" should read --(as--.

COLUMN 12

Line 44, "clock" should read --clock signal--.
Line 52, "shift a" should read --a shift--.
Line 54, "shift a" should read --a shift--.

COLUMN 13

Line 33, "637 foreseeing" should read --"foreseeing--.

COLUMN 14

Line 39, "last," should read --last--.

COLUMN 15

Line 48, "1" should read --a--.
Line 53, "lens," should read --lens--.
Line 56, "of" should be deleted.

COLUMN 16

Line 58, "measuirng" should read --measuring--.

COLUMN 17

Line 6, "suirng" should read --suring--.

UNITED STATES PATENT AND TRADEMARK OFFICE
CERTIFICATE OF CORRECTION

PATENT NO. : 5,140,359

DATED : August 18, 1992

INVENTOR(S) : HIGASHIHARA ET AL.

It is certified that error appears in the above-identified patent and that said Letters Patent is hereby corrected as shown below:

COLUMN 18

Line 64, "therefore," should read --therefor,--.

COLUMN 20

Line 59, "$TL=TM_2TR$" should read --$TL=TM_2+TR$--.

COLUMN 21

Line 10, "changing" should read --changing"--.
Line 11, " "sub-routine" should read --subroutine--.

COLUMN 23

Line 39, "shift" should read --a shift--.

COLUMN 24

Line 20, "afore-described" should read --aforedescribed--.

COLUMN 27

Line 58, "program" should read --program.--

COLUMN 28

Line 61, "form" should read --from--.

UNITED STATES PATENT AND TRADEMARK OFFICE
CERTIFICATE OF CORRECTION

PATENT NO. : 5,140,359

DATED : August 18, 1992

INVENTOR(S) : HIGASHIHARA ET AL.

It is certified that error appears in the above-identified patent and that said Letters Patent is hereby corrected as shown below:

COLUMN 29

Line 4, "coefificents" should read --coefficients--.
line 20, "data" (2nd occurrence) should be deleted.
Line 34, "distance" should be deleted.
Line 55, "of" should read --or--.
Line 65, "coefificents" should read --coefficients--.

COLUMN 30

Line 13, "focus and" should read --focus state and data conforming to the focusing state obtained by a new focus detection, said lens driving device driving the lens in conformity with said foreseeing-calculated data; and--.
Line 27, "coefificents" should read --coefficients--.
Line 35, "positions" should read --positions,--.
Line 53, "of" should read --on--.

COLUMN 31

Line 11, "outputs," should read --output,--.

COLUMN 32

Line 5, "passe," should read --passed,--.

UNITED STATES PATENT AND TRADEMARK OFFICE
CERTIFICATE OF CORRECTION

PATENT NO. : 5,140,359

DATED : August 18, 1992

INVENTOR(S) : HIGASHIHARA ET AL.

It is certified that error appears in the above-identified patent and that said Letters Patent is hereby corrected as shown below:

COLUMN 36

Line 52, "form" should read --from--.

Signed and Sealed this

Sixteenth Day of November, 1993

Attest:

BRUCE LEHMAN

Attesting Officer

Commissioner of Patents and Trademarks